United States Patent
Nishioka et al.

(10) Patent No.: US 11,570,372 B2
(45) Date of Patent: *Jan. 31, 2023

(54) VIRTUAL CAMERA FOR 3-D MODELING APPLICATIONS

(71) Applicant: Imagination Technologies Limited, Kings Langley (GB)

(72) Inventors: Suguru Nishioka, San Francisco, CA (US); James McCombe, San Francisco, CA (US); Steven Blackmon, Piedmont, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,449

(22) Filed: Oct. 2, 2020

(65) Prior Publication Data

US 2021/0037175 A1  Feb. 4, 2021

Related U.S. Application Data

(62) Division of application No. 16/232,667, filed on Dec. 26, 2018, now Pat. No. 10,834,328, which is a division of application No. 14/682,228, filed on Apr. 9, 2015, now Pat. No. 10,200,627.

(60) Provisional application No. 62/003,974, filed on May 28, 2014, provisional application No. 61/978,921, filed on Apr. 13, 2014, provisional application No. 61/977,502, filed on Apr. 9, 2014.

(51) Int. Cl.
*G06T 15/06* (2011.01)
*H04N 5/235* (2006.01)

(52) U.S. Cl.
CPC .......... *H04N 5/2353* (2013.01); *G06T 15/06* (2013.01); *G06T 2210/36* (2013.01); *G06T 2210/61* (2013.01)

(58) Field of Classification Search
CPC ... H04N 5/2353; G06T 15/06; G06T 2210/36; G06T 2210/61
USPC ........................................................ 345/420
See application file for complete search history.

(56) References Cited

U.S. PATENT DOCUMENTS

| | | |
|---|---|---|
| 6,710,808 B1 | 3/2004 | Yamagishi |
| 7,843,452 B2 | 11/2010 | Li |
| 2003/0103670 A1* | 6/2003 | Schoelkopf ........... G06T 11/001 382/162 |

(Continued)

*Primary Examiner* — Hai Tao Sun
(74) *Attorney, Agent, or Firm* — Potomac Law Group, PLLC; Vincent M DeLuca

(57) ABSTRACT

A user interface to a virtual camera for a 3-D rendering application provides various features. A rendering engine can continuously refine the image being displayed through the virtual camera, and the user interface can contain an element for indicating capture of the image as currently displayed, which causes saving of the currently displayed image. Autofocus (AF) and autoexposure (AE) reticles can allow selection of objects in a 3-D scene, from which an image will be rendered, for each of AE and AF. A focal distance can be determined by identifying a 3-D object visible at a pixel overlapped by the AF reticle, and a current viewpoint. The AF reticle can be hidden in response to a depth of field selector being set to infinite depth of field. The AF and AE reticles can be linked and unlinked, allowing different 3-D objects for each of AF and AE.

17 Claims, 14 Drawing Sheets

(56) References Cited

U.S. PATENT DOCUMENTS

| | | | |
|---|---|---|---|
| 2004/0233222 A1* | 11/2004 | Lee | G06F 3/04815 |
| | | | 345/621 |
| 2005/0041044 A1* | 2/2005 | Gannon | G01C 23/00 |
| | | | 345/660 |
| 2007/0115282 A1 | 5/2007 | Turner et al. | |
| 2008/0246757 A1 | 10/2008 | Ito | |
| 2012/0120277 A1* | 5/2012 | Tsai | H04N 5/232123 |
| | | | 348/223.1 |
| 2012/0249539 A1 | 10/2012 | Bhattacharya et al. | |
| 2012/0299920 A1 | 11/2012 | Coombe et al. | |
| 2013/0063440 A1 | 3/2013 | Son et al. | |
| 2015/0301732 A1 | 10/2015 | Henderson et al. | |
| 2016/0381268 A1 | 12/2016 | Smith et al. | |

* cited by examiner

FIG. 9
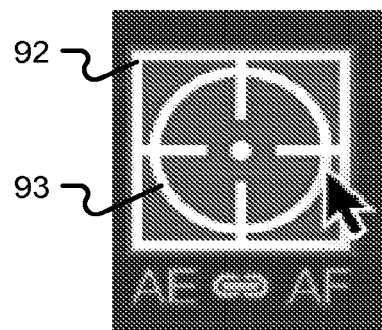
FIG. 10
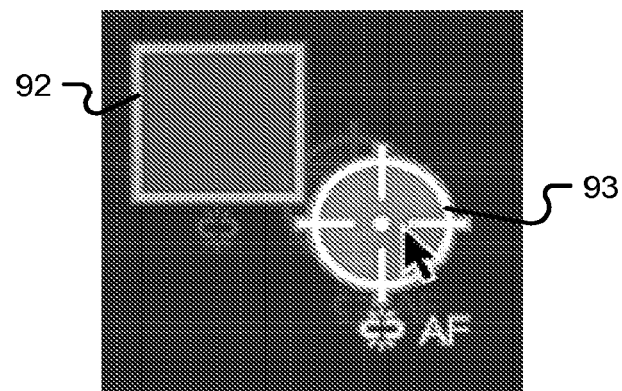
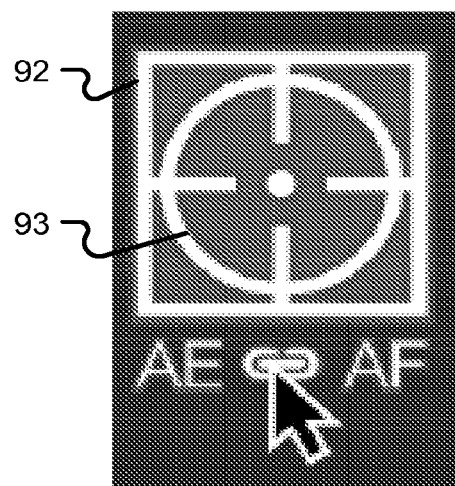
FIG. 11
FIG. 12
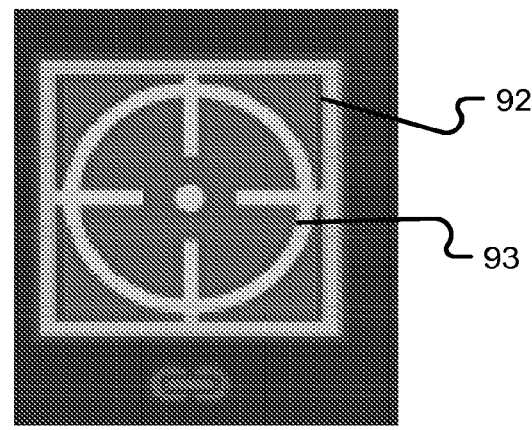
FIG. 13
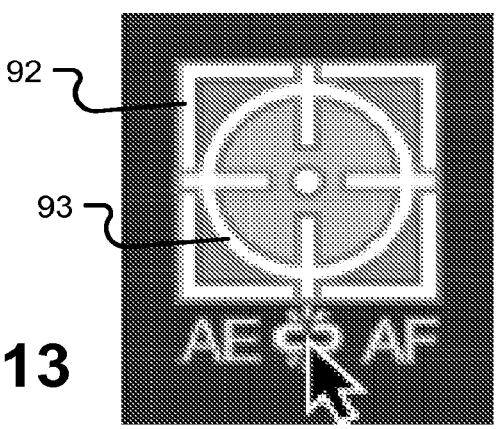

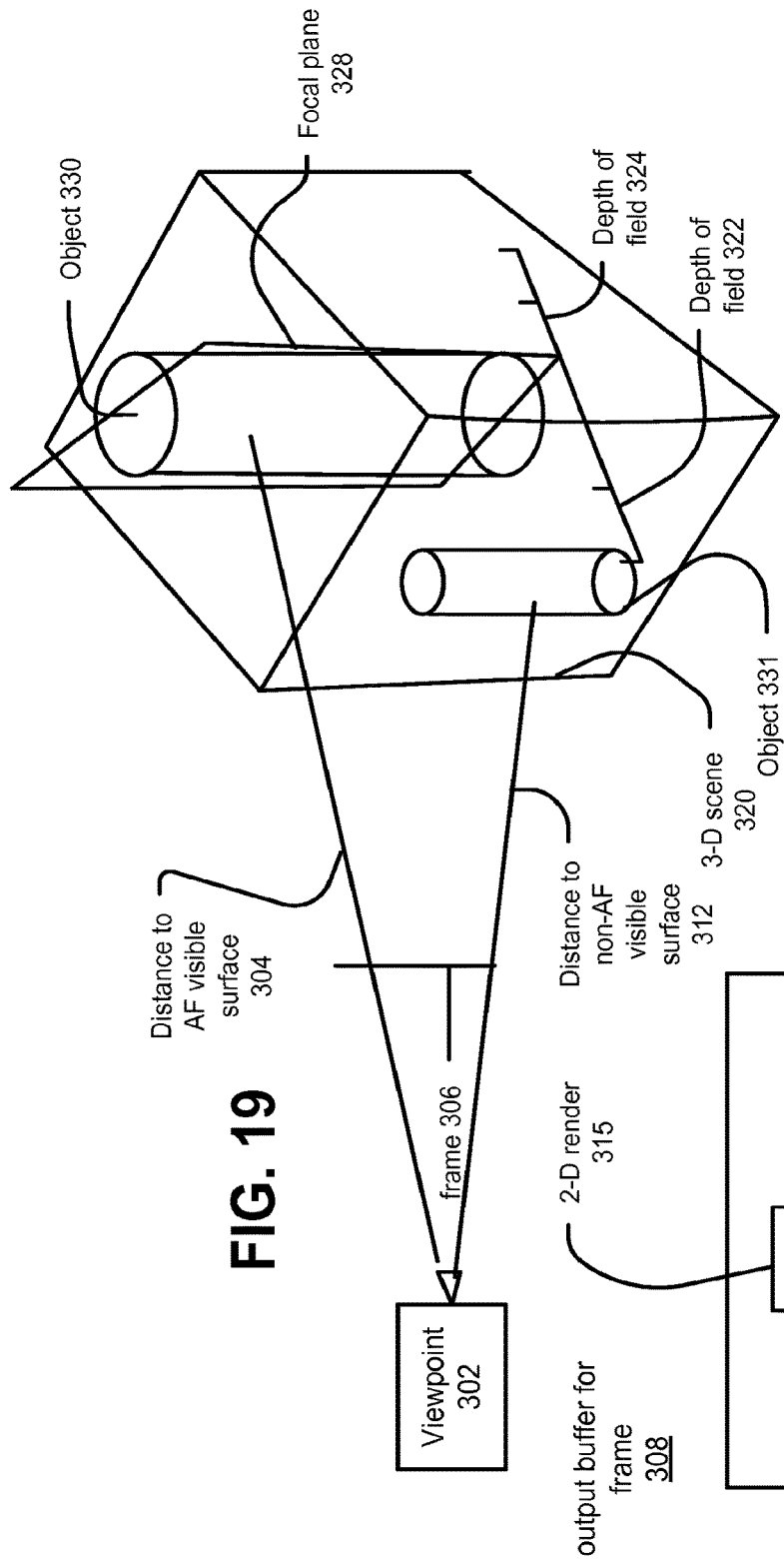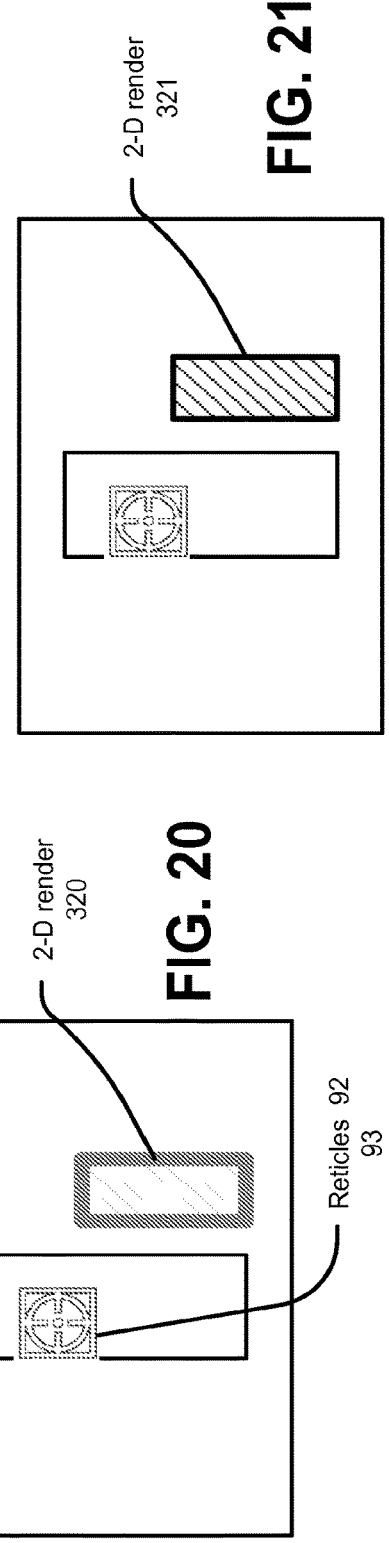

VIRTUAL CAMERA FOR 3-D MODELING APPLICATIONS

BACKGROUND

Field

In one aspect, the disclosure generally relates to producing images from 3-D scene models designed in 3-D modeling applications, such as architecture and computer aided design applications.

Description of Related Art

3-D modeling applications provide a capability to design in 3-D, to create depictions of objects, buildings, and so on. 3-D design applications can be used for designing industrial plant, equipment, houses, airplanes, landscapes and so on. Typically, 3-D modeling applications present a visual user interface in which a given 3-D design is created or edited. Such visual user interface typically supports a basic flat-shaded model of the geometry in the 3-D design, without lighting effects, such as shadows or global illumination, texturing, and so on. Sophisticated rendering is, for models of much complexity, too computationally intensive to support an interactive experience within such a user interface. While software may be integrated with 3-D design applications to produce rendered 2-D images, other approaches to interfacing with 3-D design applications remain desirable.

SUMMARY

A Render engine can be provided to implement more sophisticated rendering of a 3-D scene than is provided by a 3-D modeling application. An API may be provided between the 3-D modeling application and the render engine allowing the render engine to receive information (e.g. updates) relating to the 3-D scene so that the render engine can render a 2-D image of the 3-D scene. The render engine may for example implement a ray tracing technique which can for example take account of complex visual effects such as global illumination, ambient occlusion, shadows and so on, which are not taken into account by the 3-D modeling application. In order to produce a high quality rendered image, the render engine may require a considerable amount of time (e.g. minutes). A rendered output may be produced and then repeatedly refined to thereby progressively update a rendered image. As more refined versions of the image are produced, the quality of the image increases. For example as more visual effects are considered (e.g. as the effect of further reflected rays in the 3-D scene are taken into account) the quality of the rendered image gradually increases. In examples described herein, the progressively refined versions of the rendered images are displayed as they are rendered so that a user can see the different refined versions. The first version of the image may be rendered quickly (e.g. in seconds or even quicker) so the user does not need to wait (e.g. for minutes) for a completed image to be rendered before seeing a version of the image. Different users may have different requirements for the quality of the rendered image. Therefore, a user interface may be provided so a user can provide an indication of when the quality of the rendered image is acceptable. In response to receiving such an indication, the then-currently rendered image may be stored or captured or output, e.g. for subsequent use. The render engine may or may not continue to produce further refined versions of the image after the indication to store a current version of the rendered image has been provided via the user interface.

In particular, there may be provided a 3-D rendering process, comprising: maintaining, by a processor, a 3-D scene description file according to updates provided from a 3-D modeling application, the updates indicating changes made to elements of a 3-D scene, the changes comprising one or more of a change to geometry of an object in the 3-D scene, and a change to a material assigned to geometry in the 3-D scene; executing, by a processor, a rendering process for producing an image of the 3-D scene, the image being produced from a viewpoint, the rendering process progressively refining the image over a user-perceptible period of time; receiving, through a user interface to the rendering process, separate from a user interface to the 3-D modeling application, an indication to capture a then-current state of the image being produced by the rendering process; and storing data representing the captured image based on the then-current state of the rendering. The 3-D rendering process may further comprise continuing executing the rendering process after receiving the indication, and at a subsequent time, receiving another indication to capture the then-current state of the rendering, and responsively repeating the storing using a then-current state of the rendering, at the subsequent time.

Furthermore, there may be provided a 3-D rendering process, comprising: receiving, in a database maintenance module for a rendering engine, updates from a 3-D modeling application, the updates indicating changes to a 3-D scene; maintaining, in the database maintenance module, a local representation of the 3-D scene, separate from a representation of the 3-D scene used by the 3-D modeling application; performing rendering processes in the rendering engine to produce and repeatedly refine a 2-D image from the local representation of the 3-D scene; providing a visual interface for display, the visual interface comprising displaying a current version of the 2-D image; and storing a version of the image responsive to interaction with an image capture interface element of the visual interface, and continuing to perform rendering processes to refine the 2-D image. The providing of the visual interface may comprise initially presenting overlapping autofocus and autoexposure reticles overlapping the current version of the 2-D image, accepting a first interaction type indicating movement of the overlapping autofocus and autoexposure reticles together, accepting a second interaction type indicating unlinking of the autoexposure and autofocus reticles, and thereafter accepting separate interactions for independent movement of each of the autofocus and autoexposure reticles. The receiving, maintaining and the execution of the rendering engine may be executed on a first device, and the providing of the visual interface may be performed by a second device that receives the outputs from the rendering engine over a network interface.

Furthermore, there may be provided a 3-D rendering process, comprising: receiving updates to 3-D scene description data, describing changes made to a 3-D scene by a user through an interface to a 3-D scene editor; updating a local 3-D scene description based on the received updates; performing, in a renderer, rendering processes to produce an image from the local 3-D scene description, according to a viewpoint selected by the user through a separate user interface to the renderer; restarting the rendering processes in response to an edit performed by the user using the interface to the 3-D scene editor, unless a render lock selection has been made through the separate user interface to the renderer, the render lock indicating that the rendering processes are to continue with a non-current version of the 3-D scene; and restarting the rendering processes in response to an update to the viewpoint selected by the user through the separate user interface.

There may be provided a non-transitory machine readable medium storing machine executable instructions for performing a method comprising: providing a rendering engine that uses a first source of data describing a 3-D scene, the rendering engine configured for rendering images of the 3-D scene, from a selectable view point, wherein the rendering engine is configured to render and repeatedly refine an image, according to the then-current viewpoint and then-current data from the first source of data, and to output successive refined versions of the image being rendered; providing a user interface to the rendering engine, the user interface comprising a control for accepting an input; and responding to the input by capturing a then-current version of the image and save the then-current image.

There may be provided a method comprising: rendering an image, from a source of 3-D scene data and for a then-current viewpoint, then rendering comprising executing, on a processor, one or more processes over a period of time to progressively refine the image; accepting an input through a user interface; and responsive to accepting the input, outputting a then-current version of the image, based on data produced during the rendering. The method may further comprise, after the accepting and outputting, continuing with the rendering of the image. The method may further comprise accepting, through the user interface, a change to the viewpoint and responsively restarting the rendering. The method may further comprise accepting, an update, from a 3-D scene editor, of the 3-D scene data, and responsively restarting the rendering. The method may further comprising accepting, an update, from a 3-D scene editor, of the 3-D scene data, and responsively determining whether a rendering restart has been disabled and unless rendering restart has been disabled, restarting the rendering. The method may further comprise adding an entry to a set of images to be refined according to an offline rendering process, storing a current version of the 3-D scene, and other image setup data, and further refining the image during the offline rendering process, wherein the other image setup data may comprise focal length and exposure settings.

There may be provided a method comprising: continually producing rendering outputs for use in forming an image, from a source of 3-D scene data and for a then-current viewpoint; updating a display of a then-current version of the image being formed; accepting an input through a user interface; and responsive to accepting the input, outputting the then-current version of the image.

There may be provided a non-transitory machine readable medium comprising machine executable code and data for a plugin to a 3-D modeling program, the plugin comprising a user interface separate from a user interface to the 3-D modeling program, the user interface for the plugin providing 3-D navigation capability in a 3-D scene generated by the 3-D modeling program, and automatically beginning rendering of the image upon activating of the plugin, capturing to a non-transitory medium, in response to interaction with an element of the user interface for the plugin, and continuing thereafter to update the image.

There may be provided a system, comprising: a first device comprising one or more processors and one or more non-transitory machine readable media, the media comprising machine executable code and data for a 3-D modeling program, the 3-D modeling program having a user interface that accepts edits to a 3-D scene, the edits comprising adding, deleting and changing geometry and relative positions of geometry defining objects in the 3-D scene, and machine executable code and data for a plugin to the 3-D modeling application, the plugin comprising a rendering engine that receives updates to the 3-D scene, and progressively render an image based on a current version of the 3-D scene, and a current viewpoint; a second device comprising one or more processors and one or more non-transitory machine readable media comprising machine executable code for a user interface to the plugin to a 3-D modeling program, the user interface comprising an area for displaying versions of the image rendered by the rendering engine on the first device, and provided to the second device over a network connection, and respective control elements for accepting an indication to save a current version of the image received from the first device, and for accepting inputs to navigate within the 3-D scene, the inputs changing a current viewpoint from which the image will be rendered, wherein the second device is configured for sending data describing the current viewpoint to the plugin on the first device, causing the plugin to reset the image for rendering from the current viewpoint. The control elements of the user interface to the plugin on the second device may comprise one or more sensors of the second device. The one or more sensors of the second device may comprise an accelerometer and a gyroscope, and the user interface to the plugin may interpret the inputs to one or more of the accelerometer and gyroscope as one or more of a change in 3-D position of a virtual camera in the 3-D scene defining the current viewpoint and a change in direction of view of the virtual camera.

In some examples described herein, a user interface of the render engine displays the 2-D image rendered by the render engine. An autofocus (AF) reticle and an autoexposure (AE) reticle may be displayed overlapping the rendered image. The AF reticle is used to select a scene object to be used for determining a focal plane for use in rendering the 2-D image. The AE reticle is used to select an object in the scene for use in determining an exposure for rendering the 2-D image. The AE reticle and the AF reticle can be moved independently, or in a linked manner, to select different regions of the scene. In order to determine a focal length for the focal plane, a depth of the surface of an object which is visible at a pixel position indicated by the AF reticle may be determined using a depth buffer that stores a depth of each pixel's visible surface.

In particular, there may be provided a process for interfacing with an imaging device, comprising: presenting an interface comprising a display area for displaying an image, the interface comprising a first reticle and a second reticle, wherein the first and second reticles are presented on the display area overlapping each other, and the second reticle is rendered less prominently than the first reticle, and a slider element comprising a first end, a second end, and a position indicator; associating the first end of the slider element with infinite depth of field, and the second end of the slider element with shallow depth of field; accepting inputs through the user interface, indicating movement of the position indicator of the slider element from the first end towards the second end, and responsively re-rendering the second reticle to have a prominence corresponding to that of the first reticle (e.g. rendering the second reticle to be of equal prominence with the first reticle), setting an exposure level and a focal plane for rendering the image based on a position of the overlapping first and second reticles, and executing rendering processes to produce the image according to the exposure level and focal plane. The process may further comprise accepting, through the interface, an indication to unlink the first and the second reticle, and responsively displaying each of the first and second reticle in non-overlapping positions on the image. The process may further comprise accepting, through the interface, interaction with the slider element returning the position indicator to the first end, and responsively ceasing display of the second reticle and storing a last position of the second reticle in a memory. The process may further comprise accepting inputs through the user interface, indicating movement of the first reticle separately from the second reticle, and setting an exposure level based on a currently-rendered value of a pixel at the location of the first reticle. The process may further comprise setting a focal distance according to an object in the 3-D scene visible at a pixel overlapped by the second reticle.

There may be provided an apparatus for rendering images from 3-D scene data, comprising: a non-transitory memory; one or more processors collectively configured to perform a process comprising displaying a 2-D image produced from a 3-D scene by a renderer; displaying an autofocus reticle on the 2-D image; accepting interaction with the autofocus reticle, the interaction indicating movement of the autofocus reticle within the 2-D image, allowing different pixels of the 2-D image to be selected for autofocus; identifying a pixel of the 2-D image currently overlapped by the autofocus reticle; mapping the identified pixel to an object in the 3-D scene that provides a visible surface for the identified pixel; determining a depth of the object from a current viewpoint; and adjusting a focus of pixels in the 2-D image based on relative depths of respective visible surfaces for those pixels of the 2-D image and the depth of the object providing the visible surface for the identified pixel. The adjusting of the focus may further comprise adjusting the focus of pixels of the 2-D image based on a depth of field setting. The process may further comprise providing an autoexposure reticle, and accepting separate inputs for independently positioning each of the autoexposure and autofocus reticles. The process may further comprise hiding the autofocus reticle responsive to an input setting an infinite depth of field. The apparatus may further be configured to store a last-visible position of the autofocus reticle, and responsive to setting a finite depth of field, make the autofocus reticle visible at the last-visible position.

There may be provided a method comprising: accepting in a user interface, a selection of a pixel of a 2-D image rendered from a 3-D scene; determining a virtual object in the 3-D scene that provides a visible surface location for the selected pixel of the 2-D image; tracking a current relative distance between the visible surface location, and a current viewpoint, from which an image is to be rendered from the 3-D scene, in response to changes to one or more of the current viewpoint, and a 3-D position of the visible surface location; setting a focal distance of the image to be rendered based on the current relative distance; and rendering the image using the focal distance setting. A change to the current viewpoint may be received at a rendering engine through a user interface to the rendering engine, and a change to the 3-D position of the visible surface location may be received through an update from a 3-D modeling program, the update from the 3-D modeling program describing an edit to the 3-D scene made by a user through an interface separate from the user interface to the rendering engine. The method may further comprise restarting rendering in response to a change in the current viewpoint. The method may further comprise restarting rendering in response to a change or an update from the 3-D modeling program received at the rendering engine.

There may be provided a non-transitory machine readable medium comprising machine executable code and data for a plugin to a 3-D modeling program, the plugin comprising a user interface separate from a user interface to the 3-D modeling program, the user interface for the plugin providing 3-D navigation capability in a 3-D scene generated by the 3-D modeling program, and comprising controls accepting image-plane selection of autofocus and autoexposure, both concurrently as a single linked position, and separately as separately selectable positions.

BRIEF DESCRIPTION OF THE DRAWINGS

For a fuller understanding of aspects and examples disclosed herein, reference is made to the accompanying drawings in the following description.

FIGS. 6-16 depict example aspects of a user interface to a plugin according to the disclosure;

FIGS. 19-21 depict an example setup for determining autofocus and depth of field characteristics for rendering an image by a plugin according to the disclosure;

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

Figure 1:
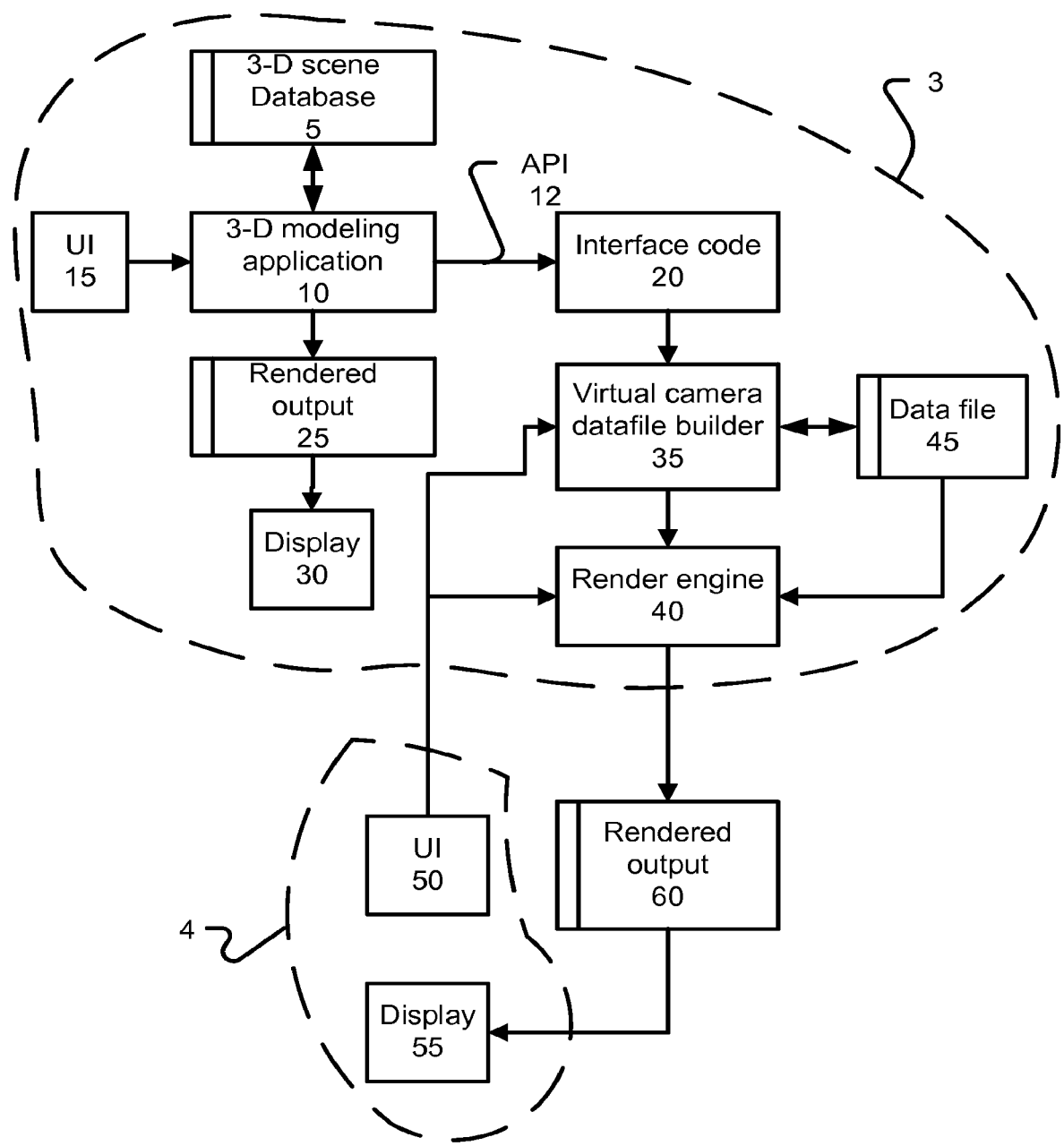
FIG. 1 depicts an example system setup in which can be implemented aspects of the disclosure.
Figure 3:
FIG. 3 depicts an example of an image generated by a 3-D modeling application.

FIG. 1 depicts a system diagram in which can be implemented aspects of the disclosure. A first device 3 includes a 3-D modeling application 10 that maintains a 3-D scene database 5. A user interface (UI) 15 to the 3-D modeling application allows a user to create, view, change and manipulate 3-D designs. UI 15 can provide a capability to adjust a viewpoint from which the 3-D scene is viewed. FIG. 3 presents an example of a 3-D scene, comprising a building and an area around the building. Such 3-D scene models the depicted building in three-dimensions, such that the building has defined dimensions, spatial arrangement, components and so on. Such building could be a model of an actual building for example, and can contain interior elements, such as floors, interior walls, lighting and so on. Such building could contain other 3-D elements such as furniture. Such building and the various elements within it can be assembled as a hierarchy of design elements. It is desirable to provide an interactive experience with 3-D modeling application 10, such that changes to a 3-D scene and changes to a viewpoint are immediately apparent. In furtherance of that principal goal, UI 15 would present a simple view of the 3-D scene, which would not attempt to render an appearance of specific materials, model sophisticated lighting, handle shadows, global illumination, and other sorts of techniques that contribute to a realistic and visually appealing image. 3-D modeling application produces a rendered output 25, which is displayed on a display 30. Rendered output 25 can include an image taken from a current viewpoint determined through UI 15.

3-D modeling application 10 can include an application programming interface (API) 12 that is used to receive information by interface code 20. Interface code 20 receives updates from 3-D modeling application 10 through API 12. Such updates can include changes to the 3-D scene, such as edits to the building depicted in FIG. 3. Other updates can include addition of elements to the 3-D scene, changes in lighting, and application of materials to surfaces in the 3-D scene. A virtual camera datafile builder 35 receives these updates from interface code 20 and maintains a datafile 45 based on these updates. Datafile 45 is used as input to a render engine 40. Render engine 40 is controlled through a UI 50, which is separate from UI 15. Example aspects of UI 50 are disclosed in the following. Render engine 40 provides uses datafile 45 as a source of 3-D scene data for rendering. Render engine 40 produces a rendered output 60, which can include an image prepared from a viewpoint selected through UI 50, such that the viewpoint used by render engine 40 can be different from the viewpoint for rendered output 25. Render engine 40 may use a variety of other inputs in producing the rendered output, including a lens model, exposure and focus settings. Such rendered output 60 can be displayed on a display 55.

Figure 4:
FIG. 4 depicts an example of an image generated by a plugin to the 3-D modeling application, and aspects of a user interface to the plugin, which is separate from a user interface to the 3-D modeling application.

Render engine 40 can implement a path tracing rendering technique, for example, which can account for global illumination, ambient occlusion, shadows, and so on. An example output of Render engine 40 is shown in FIG. 4.

UI 50 provides a simplified user interface model. In one implementation, UI 50 and display 55 are implemented in a device separate from device 3. For example, device 3 can be a desktop or laptop computer, which device 4 can be a smaller form factor device, such as a cellphone or tablet. Other characteristics which can distinguish device 3 from device 4 include that an amount of energy stored in a battery of device 3 can be greater than device 4, and that available processing resources of device 3 can be greater than those of device 4.

Collectively, virtual camera datafile builder 35, render engine 40, and UI 50 can be functionally integrate as a plugin to 3-D modeling application 10. In order to obtain rendered outputs, a user can activate the software. When the software finishes initializing and building datafile 45, the software immediately begins to produce rendered output. In order to produce a high quality rendered output, some considerable amount of rendering time would be expected for complicated 3-D scenes. Rendered output 60 is progressively updated as rendering results are produced. Such rendering results can be stored in multiple buffer locations, and combined or blended in order to produce per-pixel image results.

Such progressive updating means that the image will become more complete with more rendering time passing, even after many minutes have passed. However, different users and a given user in different circumstances may be satisfied with images of varying qualities. As such, user interfaces according to the disclosure provide a capability to indicate when the image being displaced is acceptable for capture. So, while render engine 40 continues to refine rendered output 60, a user can decide when rendered output 60 is suitable for a given purpose and then cause a current state of the rendered output 60 to be captured.

Figure 2:
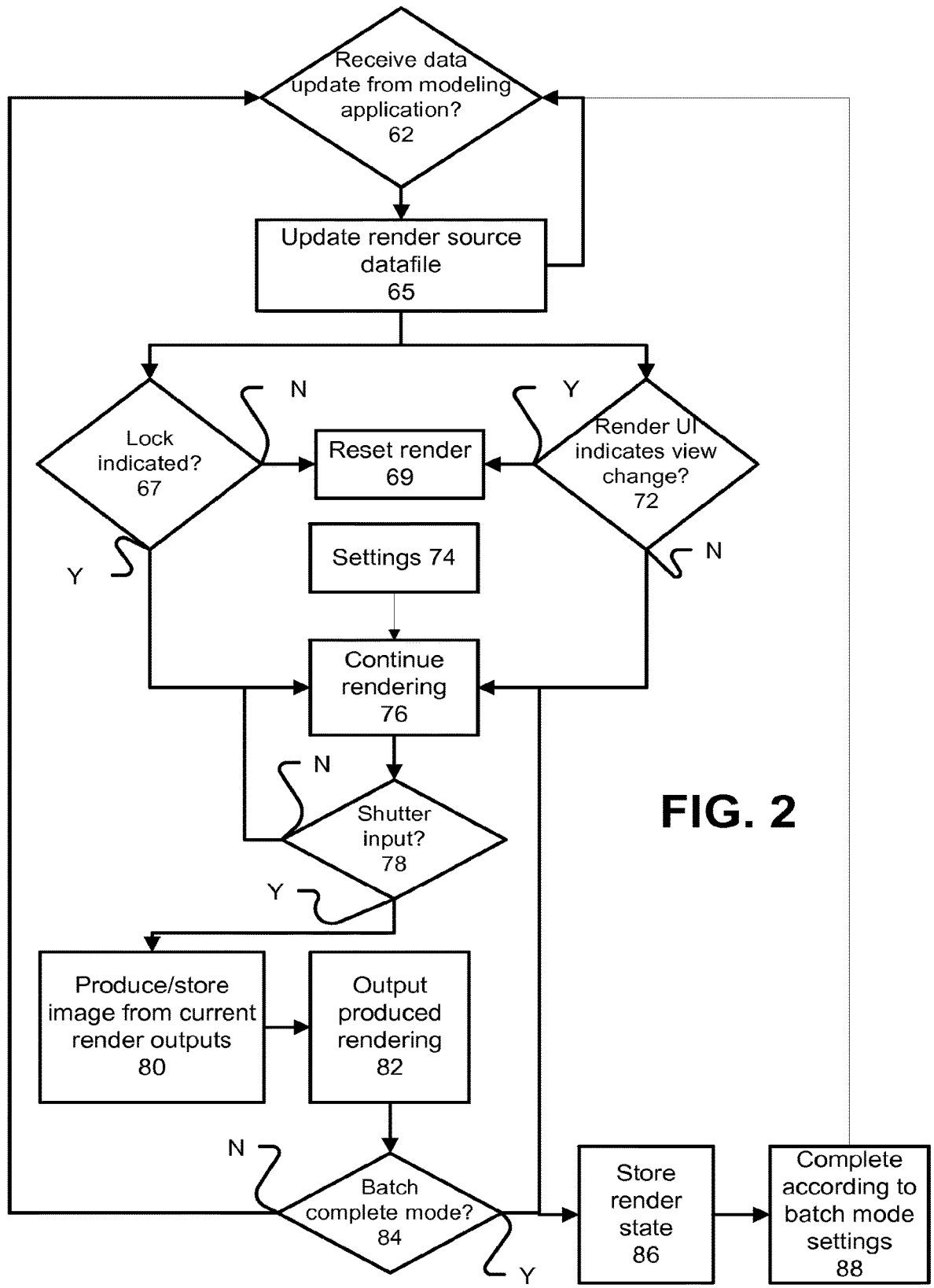
FIG. 2 depicts an example process implementing a continuous image refinement and capture interface according to the disclosure.

FIG. 2 depicts an example process flow which can be implemented in aspects of the disclosure. At 62, it is determined whether an update is received from a modeling application, and if so, at 65, a datafile is updated. Then, at 67, it is determined whether a render lock has been selected through the render UI. Absent a render lock, a change to the render source datafile would cause a restart of the rendering processes by render engine 40 (at 69, resetting the render). However, if a render lock is active, then an in-progress rendering continues. Also, at 72, a check is made whether a change in viewpoint has been made in the render UI. In such a circumstance, even if a render lock is active, the render can be reset, because the input came from the render UI, not from updates to 3-D scene. As such, a user may continue to interact with and change a source 3-D model, while allowing an in-progress rendering to proceed.

Otherwise, rendering continues at 76, using settings input 74. If a shutter input is detected at 78, then, at 80, an image is produced based on then-current render data, and output at 82. The displayed image may have been updated regularly, or in response to availability of new rendering results. In general, an image saved may have further updates to it after a shutter input was detected. In some situations, a current image being displayed may not be stored in a single render buffer and in those situations, some processing may be undertaken to produce the image to be stored. In some implementations, the displayed image can simply be saved. Various options to share the image can be provided. Image options, such as a file format and resolution also can be provided.

Some implementations can support a batch complete mode. A batch complete mode provides a capability to continue to refine a particular image setup, at a later time, in response to saving an image for that image setup based on then-current rendering state. As stated above, in many cases, an image being displayed represents a partially completed rendering that is being refined in real time. As such, more rendering time allows further refinement of an image based on that rendering setup. However, a user may desire to use a less-refined version of the image for some more immediate purpose rather than wait for a more-refined version. Therefore, in batch complete mode, render engine 40, in response to shutter input at 78, also can store, at 86, render state pertinent to the image. The render state includes the viewpoint, and a current version of the 3-D scene, as represented by datafile 45. At 88, a more refined version of the image can be produced at a later time. Thus, some implementations of the example process of FIG. 2 supports a continuous refinement of an image being rendered, a capability of a user to indicate when the image is acceptable (or more generally when the user desires to save some version of the image), and also allow production of a higher quality version of the 3-D setup that produced the image that the user indicated to capture. A number of images for different 3-D setups can be captured, and binned for offline rendering. Batch complete can be selected on a per-image basis, for a particular project, or turned on or turned off as a default.

With respect to the example process of FIG. 2, it should be understood that the example started with receiving a data update from a 3-D modeling application. However, a rendering may be in progress, such that action 66, continuing rendering can be proceeding concurrently, and other portions of the depicted process can be performed in response to receiving 3-D scene updates and to UI 50 inputs, for example.

In some examples, the rendering process may be performed remotely. That is, the render engine may be implemented at a remote location to the device 4 and/or to the device 3, e.g. the render engine may be implemented in the cloud and data may pass between the render engine and the device 3 (and device 4) over a network such as the Internet. Furthermore, in some examples, when a current version of the rendered image is captured it may be stored remotely, i.e. in a store which is located external to devices 3 and 4, e.g. stored in the cloud.

In some examples, the indication to capture a then-current state of the image is received responsive to a determination that the rendering process has been executing for the image for a first time period. In this way, the state of the image is captured after the render engine has been refining the image for the first time period, which may for example be 30 seconds or 1 minute, etc. Furthermore, the indication to capture a then-current state of the image may be received responsive to determining an amount of noise in the then-current image produced by the rendering process. In this way, when the amount of noise in the rendered image falls below a threshold level, the image can be captured at that point. A user may set the threshold noise level at which the image is deemed satisfactory. Alternatively, the threshold noise level may be set automatically.

In some examples, when a current state of an image is captured, scene data and viewpoint data may be stored for subsequent use in executing the rendering process to further progressively refine the image when the refinement is resumed at a later time.

Figure 5:
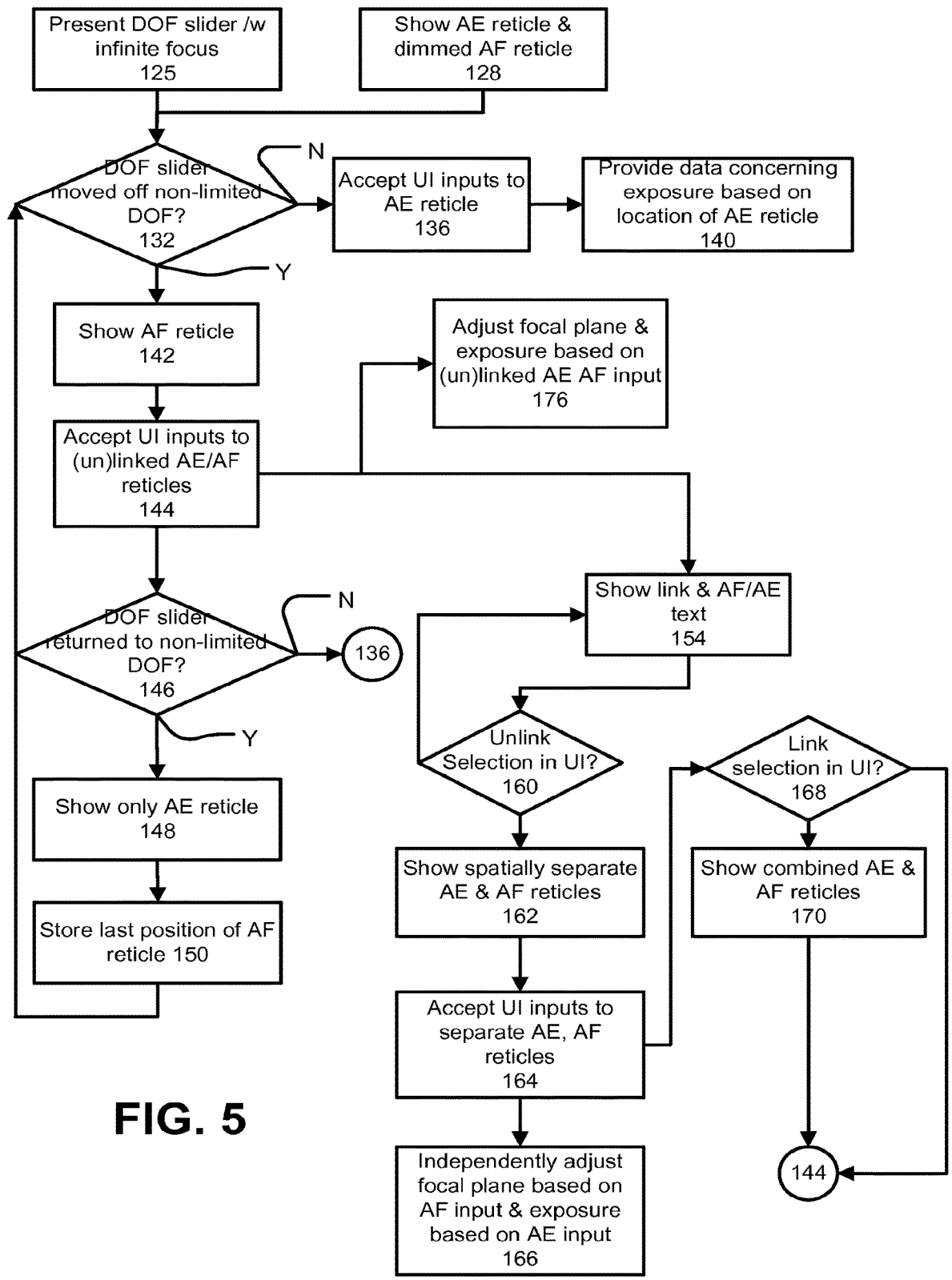
FIG. 5 depicts a process for a user interface to provide one or more of autoexposure and autofocus capabilities within a user interface to a plugin according to the disclosure.

As introduced above, a UI 50 is provided for controlling a viewpoint and other controls that allow control of how images are captured from a particular 3-D scene generated from a 3-D modeling application. FIG. 5 depicts an example process for implementing example features of UI 50. Aspects described with respect to FIG. 5 are also described with respect to FIGS. 6-18, which present example user interface elements resulting from actions involved in the example process of FIG. 5. At 125, a Depth of Field (DOF) slider is presented, at an initial setting of non-limited depth of field, which in terms of photography, means that an aperture size is being modeled in render engine 40 is small compared with a limited depth of field. In physical photography, a depth of field is influenced by a number of factors, including a type lens system, sensor or film type. Since embodiments of the disclosure can be virtually modeling behavior of a camera, there is not a specific requirement or limitation that render engine 40 produce an image that would have been produced by a particular lens, or camera sensor type, and so on. Rather, depth of field herein can be understood from the perspective that, for a given focus distance, the DOF slider controls an aperture size from a smallest aperture available (which can be based on other rendering inputs) to a largest aperture size available.

Figure 6:
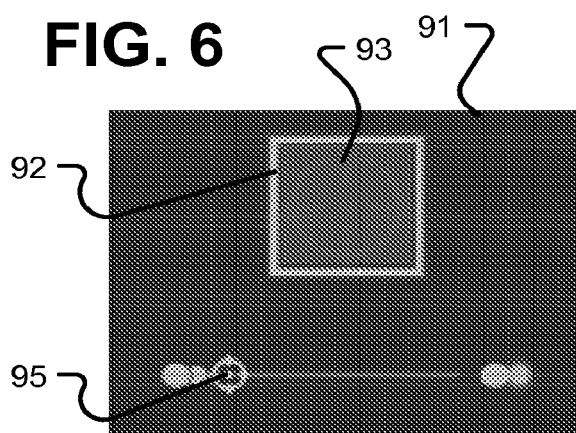
Figure 7:
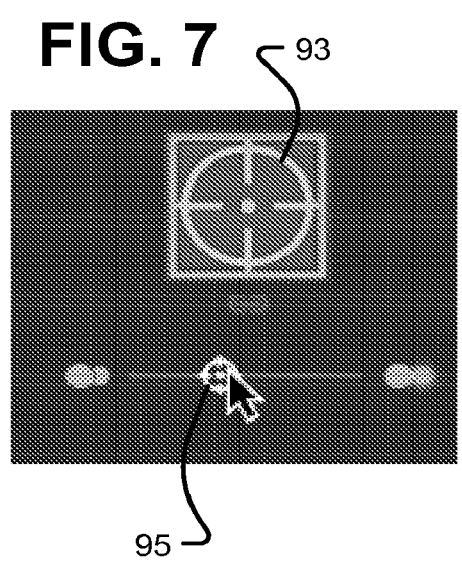

Also, at 128, an AutoFocus (AF) reticle and an AutoExposure (AE) reticle 92 are displayed. FIG. 6 depicts a square AE reticle 92 and a cross-hair AF reticle 93. Initially, AF reticle 93 can be shown as overlapping AE reticle 92, indicating that an area for AE and an image area for AF are the same (with further consideration of the DOF slider, as explained below). FIG. 6 also depicts an example DOF slider 95. Example DOF slider 95 is shown setup for non-limited DOF. While AF reticle 93 initially can be shown as overlapping AE reticle 92, AF reticle 93 is also shown as being ghosted. AF reticle 93 is displayed as ghosted in response to the DOF slider being set at non-limited DOF. At 132, a determination is made whether the DOF slider has been moved from the non-limited position (such as to the position depicted in FIG. 7). If so, then, at 142, AF reticle 93 is shown non-ghosted, such as depicted in FIG. 7. A color of AF reticle 93, while the DOF slider is being engaged (such as with a mouse or other pointer device, or gesture), can be changed from a default color of AF reticle 93.

With the DOF set to a limited setting, UI inputs can be accepted, at 144, to the linked AE/AF reticles 92 93, meaning that the reticles are moved synchronously with each other. In one implementation, the AE/AF reticles 92 93 are overlapped with each other, as shown in FIG. 7, while they are moved synchronously. As such, in such an implementation, a user may select one part of the scene for both AE and AF.

Figure 8:
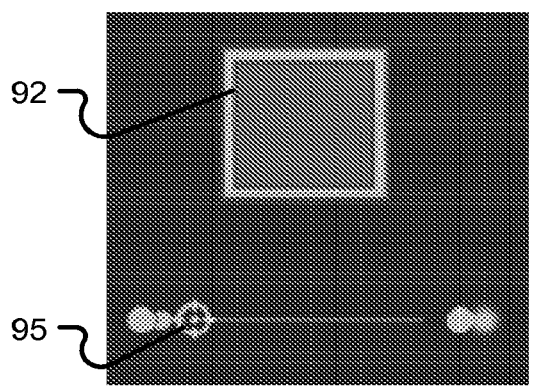

At 146, a determination is made whether DOF slider is returned to non-limited DOF, as shown in FIG. 8. If so, then AF reticle 93 is hidden, indicating to a user that only an AE is available for selection, and since the user has interacted with the DOF slider and has seen AF reticle 93, AF reticle 93 can be hidden, to simplify the UI. From action 132 and from action 146, UI inputs to AE reticle 92 can be received at 136. Such UI inputs involve moving AE reticle 92 to a position in a displayed image (example in FIG. 4), which indicates that the user wants to adjust exposure based on the selected portion of the image. At 140, data is provided to render engine 40 for exposure adjustment based on the received UI inputs.

Figure 14:
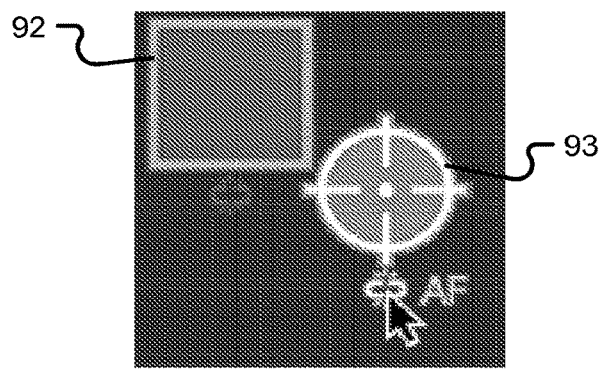
Figure 15:
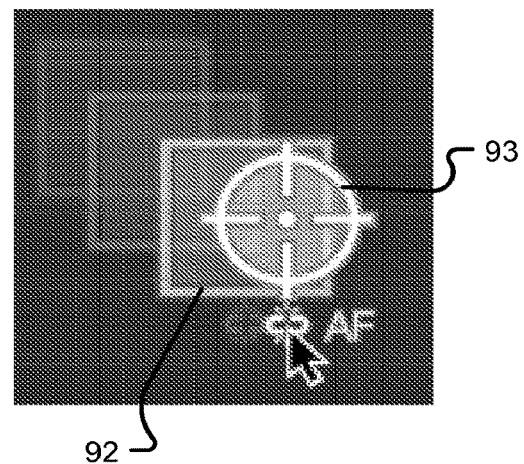
Figure 16:
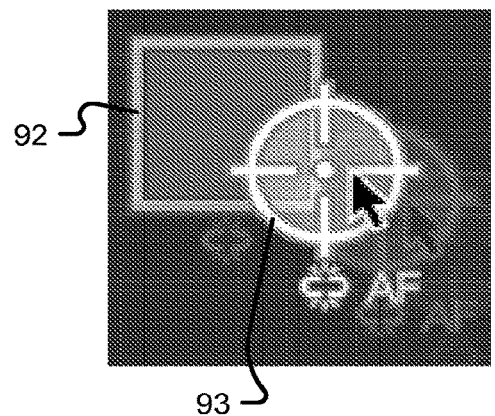

Returning to 144, if UI inputs are accepted to linked or unlinked AF reticle 93 and AE reticle 92. Such UI inputs can include moving UI inputs causing such display can include a mouse over or a touch gesture, for example. UI inputs can be determined to be directed to these reticles by detecting a mouse over or a touch within a region of screen space occupied by the reticles 92 93. If the reticles are linked, then a link and AF/AE text can be depicted with these reticles, as shown in FIG. 9. FIG. 12 depicts another example of how linked AF and AE reticles 93 and 92 can appear in response to UI interaction, in that text AF and AE may not be included. In another example, a color of the reticles can be changed. FIGS. 14-16 depict examples of reticles 92 and 93 unlinked. If UI inputs accepted at 144 include moving either linked reticles or, if unlinked, either reticle, then the reticle or reticles involved can be moved as appropriate. Also, at 176, one or more of a focal plane and exposure of the image can be adjusted based on the received UI inputs.

At 160, it is detected whether a selection to unlink the AF and AE reticles 92 93 is made (assuming that the AF and AE reticles are linked). If so, then at 162 spatially separated AF 93 and AE 92 reticles are shown. FIG. 11 depicts an interaction with the link shown; clicking on the link indicates that the AE and AF reticles are to be decoupled. Another UI input to indicate such decoupling can include selecting and dragging one of the reticles away from the other. FIG. 13 depicts an example of clicking on the link of FIG. 11, showing a change of the link from a coupled to a decoupled state. FIG. 13 also shows that colors of the reticles can be updated to be different from each other. FIG. 10 depicts an example result of decoupling AF 93 and AE 92 reticles; and by particular example, FIG. 10 depicts that decoupled AF reticle 93, when interacted with, shows the text "AF" and also shows an unlocked link, compared with the connected link of FIG. 11.

At 164, inputs can be accepted separately to each of AE and AF reticles 92 and 93, allowing different scene objects to be selected for exposure and focus; and at 166, a focal plane and exposure can be adjusted independently in response to these inputs. After the AF and AE reticles are uncoupled, UI inputs can be received at 168 to indicate that these reticles should be recoupled. Such UI inputs are exemplified by FIGS. 14 and 15, which depict that a mouse click or touch (FIG. 14) on the unlocked link causes relinking FIG. 14 also depicts that such unlocked link can be displayed responsive to mouse over, or a touch on reticle 93. FIG. 15 depicts that if clicking on the unlock link for AF reticle 93, that AE reticle 92 can be animated into a coupled position around AF reticle 93. Conversely, if UI inputs indicated interaction with AE reticle 92, then an uncoupled link can be displayed with respect to AE reticle 92, and responsive to a mouse click on that uncoupled link, AF reticle 93 can be animated into position around AE reticle 92. In response to such relinking inputs, FIG. 16 depicts that another approach to recoupling these reticles includes that one of the reticles (e.g. AF reticle 93) can be clicked and dragged over the other reticle. Upon recoupling, inputs can be accepted at 144. At 168, if there is no link selection, then a return to action 144 can occur.

The example process flow of FIG. 5 shows a limited exemplary set of user interactions with UI 50. In actual operation of implementations of UI 50, the various determinations may occur in different relative ordering, depending on how a user actually interacts with UI 50. For example, at 144, UI inputs are not necessarily accepted, but only if a user provides such inputs, and instead, a user can simply return the DOF slider to non-limited DOF, without ever changing a position of the reticles. A similar situation holds for actions 164, and 172. Some actions need not be implemented. For example, hiding an AF reticle (showing only an AE reticle) at action 148 is optional. For example, at any of the actions, such as action 168, a user may move the DOF slider to a non-limited DOF, and an implementation of the process of FIG. 5 can then perform actions 148, and so on. However, to arrive at action 168, AF 93 and AE 92 reticles must have been unlinked. As such, FIG. 5 does not imply that only certain portions of UI 50 are active, although a state of UI 50 depends on prior interaction with, and default settings for such.

Figure 17:
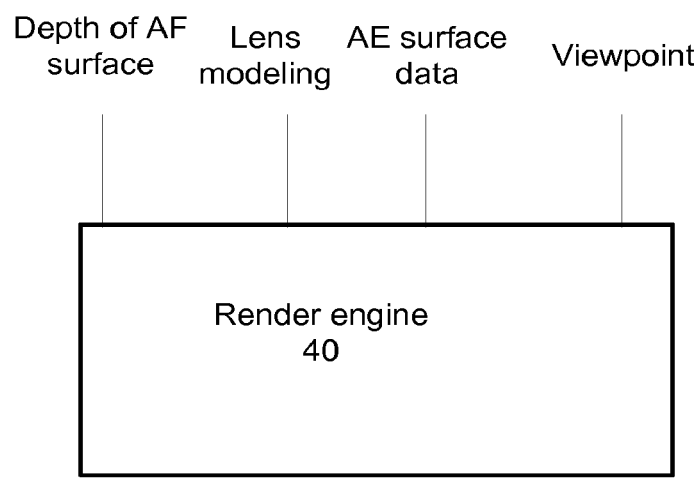
FIG. 17 depicts a rendering engine and inputs thereto, the rendering engine producing the imagery for the plugin.

FIG. 17 depicts that render engine 40 can receive a variety of inputs, including a depth of an AF surface, data describing a lens model, data concerning an AE surface, and a viewpoint. A depth of an AF surface can be determined by identifying a pixel that is centered in AF reticle 93. A depth buffer that stores a depth of each pixel's visible surface can be provided in some implementations, and if available, that depth buffer can be queried to obtain a depth of the AF surface. In another implementation, barycentric coordinate information for a hit point on the visible surface can be used, along with the location of the pixel and a viewpoint, to perform a reverse transformation to identify 3-D location of the visible surface, and based on the viewpoint, a depth of the visible surface. Information about an AE surface can include data obtained from rendering results buffers, and can include information such as luminosity and color. This data can be updated over time, as more rendering results are obtained for that visible surface. As introduced above, a current viewpoint selected through UI 50 can be supplied to render engine 40. With respect to AF and AE, there may be some imprecision about which pixel is being selected, and some further processing can be incorporated; for example, if a user puts AF reticle 93 on a boundary between an object and a background, then the pixel associated with the object can be selected as an autofocus pixel. This disclosure does not require that a single pixel be selected for any of AF or AE.

Figure 18:
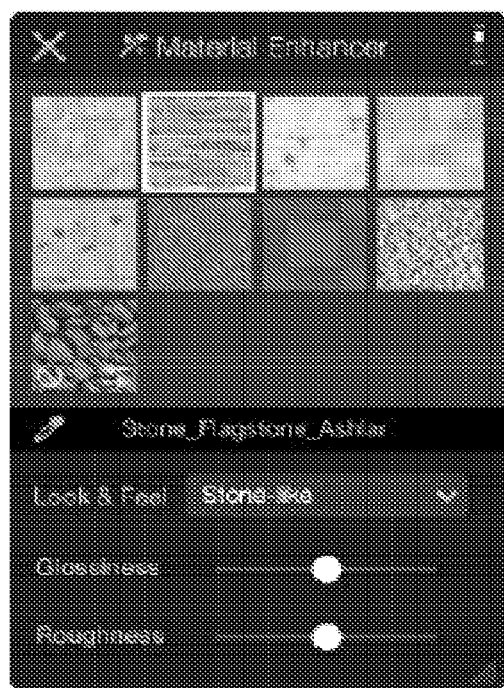
FIG. 18 depicts an example of a materials enhancement user interface for a plugin according to the disclosure.

FIG. 18 depicts a materials enhancement user interface. Information provided from 3-D modeling application 10 through API 12 can include text information describing basic material names to be associated with a given object. For example, in FIG. 3, a thin rectangle can be used to model one of the windows shown in the building of FIG. 3. That thin rectangle can be defined in data provided from 3-D modeling application 10 and can be associated with text 'glass'. Rendering engine 40 can parse this text, and add rendering effects. For example, with respect to a material identified as 'glass', rendering engine 40 can execute a shader that models some reflection to the glass. Also, a materials enhancement UI, such as that depicted in FIG. 18 allows materials parameters for materials on 3-D objects to be set within 2-D image space. For example, a pixel associated with a window can be selected, and then a materials enhancement UI can be selected to provide that the glass has a pattern, or roughness to it, an amount of dirtiness, or a color tint, for example. With respect to other materials, glossiness and roughness can be adjusted for selected materials. A materials enhancement UI according to the disclosure also can operate without using text from 3-D modeling application, and can operate using information directly received from UI 50. For example, a particular object can be indicated as "stone like", steel, glassy, water, paint, or other kinds of materials. In some cases, instances of an object (such as repeated instances of a window), can be enhanced by selection of one such instance within UI 50, and that selection can be propagated by datafile builder 35 to all instances of that object.

Material properties associated with an object may be determined by automatically assuming the material properties associated with the object. Alternatively, material properties associated with an object may be determined by receiving an indication of the material properties associated with the object from a user via a material enhancement user interface. As another alternative, the material properties associated with an object may be determined by associating, with the object, material properties of a material from a set of pre-determined materials for which material properties are pre-determined. For example, the pre-determined materials may be designed to approximate common real-world materials such as stone, glass or water, for which material properties can be pre-determined. As described above, the material properties associated with an object may be inferred from textual strings associated with the object. Furthermore, one or more of the material properties associated with an object may be inferred based on one or more other known material properties of the object, e.g. an index of refraction may be attributed to a material based on a known transparency property of the material. As another example, the determination of the material properties associated with an object may include inferring one or more material properties based on the shape, position or orientation of the object in the 3-D scene, e.g. wood floors are often shiny but wood cabinets are often not as shiny, and the shape, position and orientation of a wooden object can be taken into account when determining the material properties to be associated with the object.

FIG. 19 presents an illustration concerning determining a depth for AF and depth of field related considerations. FIG. 20 depicts an output buffer 308 for rendered output 60 includes a depiction of a 2-D render for object 330 in scene 320. Output buffer 308 is based on the location of frame 306, which defines a visible area and a resolution of buffer 308. Combined reticles for AF and AE 92 and 93 are shown overlapping 2-D render 315. This implies also that depth of field is currently selected to be limited (and not unlimited). Based on selection of pixels in output buffer 308, object 330 is identified as a visible surface, and a distance to the visible surface for AF is determined (304). Such distance can be used to define a focal plane 328 (defining a focal plane is not required). Based on a current depth of field setting, 2-D render 320 of object 331 is shown to have a certain degree of blurriness. This blurriness can be understood with respect to a depth of field 320 depiction, that shows object 331 is far enough from focal plane 328 so that portions of object 331 are out of focus (or more out of focus than elements of 3-D scene 320 closer to focal plane 328). FIG. 21 depicts an example where a depth of field has been increased to depth of field 322, such that 2-D render of object 331 is sharper (more in focus) than 2-D render 320 of object 331. As such, FIGS. 19-22 depict that an actual depth of an object selected for AF can be determined, based on 3-D scene geometry data.

Another aspect of the disclosure includes identifying an object (and also, in some implementations), a location on such object, for AF, and then tracking that object/location on that object for autofocus, as the object changes position relative to the viewpoint. Such changes can result from changing the viewpoint in UI 50, or by changes to the 3-D scene that originate from UI 15, and are received through interface code 20, to builder 35, and used to update data file 45. As such, implementations allow rendered output 60 to include an image that has a focus determined based on an updated position of an object previously selected for autofocus, and a depth of such object can be derived directly from 3-D scene data.

Figure 22:
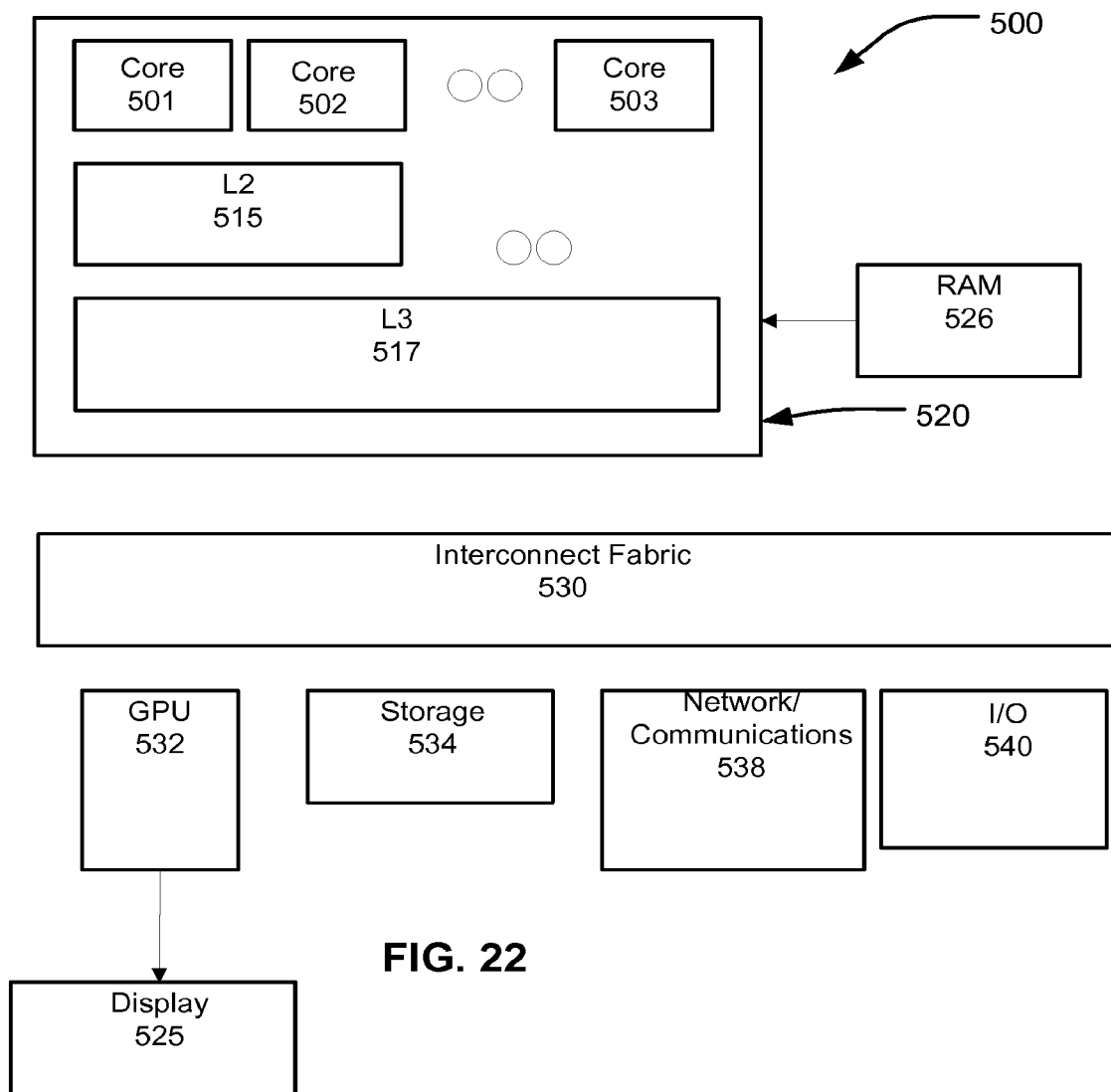
FIG. 22 depicts an example processor system in which can be implemented aspects according to the disclosure.

FIG. 22 depicts an example of a system 500 that can implement aspects of the disclosure. System 500 includes a set of processor cores 501-503, which can each be capable of executing one or more independent threads of control. Each such core 501-503 can have an instruction decoder, for decoding instructions according to an instruction set architecture. Each core can have a private Layer 1 cache. Each core 501-503 can support single instruction multiple data processing, such as a four-wide, eight-wide, sixteen-wide, twenty-four wide or thirty-two wide vector processing unit. The example system 500 includes a Layer 2 cache 515 shared between a subset of cores (e.g., cores 501 and 502).

System 500 includes a Layer 3 cache 517 shared among all processor cores 501-503. These elements of system 500 can be included within a module 520 that can itself be tiled.

Module 520 can have an interconnect or internal fabric that connects L3 517 with the cores and with L2. Cache coherency logic can be provided, to implement different cache coherence schemes. L1, L2 and L3 caches can be maintained to be inclusive or exclusive. A RAM 526 may serve all cores 501-503, and may be coherent or incoherent with respect to GPU 532. An interconnect fabric 530 can connect multiple modules 520, a Graphics Processing Unit 532, a storage unit 534 (e.g., mass storage such as magnetic hard drives, or flash memory), one or more network interfaces 538, and an input/output 540 interface, such as PCI-express, an optical interconnect Universal Serial Bus (USB), and so on. System 500 also can have a display 525, which can be coupled with GPU 532. As such, FIG. 20 depicts an example system that is generally in accordance with a conventional computation system, such as a personal computer, a server, a laptop, or even to a tablet or cellphone. Different of these system types can provide different numbers, configurations of the depicted elements, according to target design criteria, such as processing capability, power consumption, display resolution, and so on.

For example, a server can have a vastly higher power consumption envelope than a tablet form factors, as well as a higher price point, which allows more processing capability in module 520, such as more cores, more complicated cores, such as out of order, multiple issue cores, wider SIMD vectors, larger caches, and so on. Some systems may implement many of the functional components shown in within a system on chip. For example, cores 501-503 and GPU 532 may be monolithically fabricated, and may interface to an L3 cache formed on a separate die.

Further aspects are described below with reference to FIGS. 23 to 27, which relate to ray tracing accelerators that operate within a power envelope supported by an external chassis data interface. Such accelerators include fixed function hardware elements and grouping logic that group rays according to test criteria. Such accelerators support processing more rays with less power consumption that using only software configuring general purpose programmable cores, including the overhead of communicating across the interface. Even at a 90 nm process node used to form such an accelerator, a combination of the same programmable platform, with an accelerator, supports at least 5-8 and up to 10 times more ray throughput than using only the cores. Using the cores can require on the order of 12 watts to process 1 million rays, while the accelerator can process on the order of 10 million rays in under 10 watts.

A general purpose computing system, such as a laptop or desktop computer, has become increasingly powerful. However, capabilities to perform some kinds of computation workloads have not commensurately increased. For example, while a general purpose processor can have high throughput for general purpose code execution, where temporal data locality and other common assumptions are generally true. On the other hand, graphics processing units (GPUs) have become increasingly parallelized, and theoretically have a large amount of processing power. Such theoretical maximum computation capability also assumes workloads that are suited to fully using SIMD capabilities of the GPU. For wide GPU architectures, many workloads do not support SIMD parallelism of that magnitude. Also, current powerful GPUs, used for desktop and laptop applications, have power envelopes on the order of at least 30 watts, and for the most powerful GPUs, at least 200 watts, and sometimes more than 300-400 watts.

Such power envelopes require an in-chassis power connection. Such in-chassis power connection can come from a separate power supply connection, such as a 12V power supply connection that may source more than 20 amps of current. These power supply connections may be supplied to one or more boards resident in a PCI express slot. Under 75 watts, the built-in power sourcing capability of the slot itself can power the GPU card, while one or more additional connectors can be plugged directly into the GPU card. For example, a 450 watt GPU card can use two eight-pin and one six-pin power connector, while a 150 watt card can use one six-pin connector. As such, with no other power supply connector to an in-chassis PCI express GPU card, such card can draw up to 75 watts, and can and do expand with in-chassis power connections to many times that amount.

However, out of chassis expansion interfaces do not provide such power envelopes. For example, a Thunderbolt connector provides a total power delivery capability of 9.9 watts, delivered by a 19 v DC with 550 mA maximum current. A Universal Serial Bus (USB) interface is lower power still. A USB data transfer port can deliver 900 mA during high speed data transfer (while charge only ports can deliver more power). So, during high speed data transfer, a USB port can deliver approximately 4.5 watts of power.

The present disclosure relates, in one aspect, to a ray tracing accelerator that traverses rays through a 3-D scene, including traversing rays through an acceleration structure and testing rays for intersection with primitives that remain after acceleration structure traversal, within a power envelope supported by a Thunderbolt connection, which is less than 10 watts. In one implementation, the rays are defined by a host processor, and definition data for such rays are stored in a memory. Such ray definition and storage tasks can be performed by a driver interfacing with an application running on the host processor. References to such ray data are supplied to the ray tracing accelerator. The ray tracing accelerator includes fixed function circuits to implement acceleration structure traversal tests, and fixed function circuits to implement primitive intersection tests. The ray tracing accelerator also includes a ray grouping unit, which groups rays together that need to be tested against either the same primitive or the same acceleration structure element. The ray grouping unit forms a data structure that identifies rays of a given group, and dispatches the data structure for processing by the fixed function circuits. In one implementation, each of the fixed function circuits has access to a private memory that stores ray definition data for a subset of the rays being processed by the ray tracing accelerator at that time. In one implementation, all tests for that ray are performed by that fixed function circuit, and that fixed function can retain, in the private memory, an indication of a closest primitive intersection yet-identified.

In one example, acceleration structure elements are boxes, such as axis aligned bounding boxes, and primitives are triangular primitives. The ray tracing accelerator can return an indication of each intersection identified between any of the rays and geometry in the 3-D scene. Shading of these rays can be performed on the host platform. In one example, 32 fixed function acceleration structure circuits are provided and 32 fixed function primitive test circuits are provided. In one example, the fixed function acceleration structure circuits can process one acceleration structure element in one clock cycle, while the primitive test circuits can test one primitive in 3 clock cycles. Such ray tracing accelerator supports, on a steady state basis, completing more than 9 million rays per second within this power envelope in a chip fabricated on a 90 nanometer TSMC process when operated at 350 megahertz. Implementations can have a steady state throughput of 10-12 million rays per second. Such implementation supports about 11.2 billion acceleration structure element tests per second and 2.8 billion primitive intersection tests per second, within the 10 Watt envelope, and within around 7 watts. These metrics include accessing data defining the acceleration structure elements and the primitives from an external (external to the semiconductor die containing the test circuitry) dynamic RAM. For example, such dynamic RAM can be a single DDR2 memory. This memory can be populated by transactions across the expansion interface.

Using a multicore general purpose processor, in a thin and light laptop configuration, such as a Haswell series processor from Intel®, with at least 8 Gb of ray, provides a throughput of about 1 million rays, and uses about 18-19 watts of steady state power. Subtracting idle power used by the platform of about 7-8 watts, such platform uses about 12 watts to process about one million rays per second. This metric includes shading the rays that need to be shaded using about 2000 floating point operations per ray. Such operations may be comprised of about 500 instructions that are used to control a 4 wide SIMD floating point unit.

Some implementations provide that the ray grouping unit forms memory access requests to initiate retrieval of primitive data or acceleration structure data that is retrieved from a system memory, or a memory used by the ray tracing accelerator (or both), and supplied to the group of tester circuits in parallel (i.e., primitive data is supplied to the primitive test circuits and acceleration structure data is supplied to the acceleration structure test circuits). Some implementations may support local caching of a limited number of such data, while other implementations simply discard such data after use.

In another aspect, the present disclosure relates to a single semiconductor substrate that includes a graphics processor unit comprising a plurality of programmable shader clusters and a ray tracing accelerator. The single semiconductor substrate, and supporting devices, such as a memory, and power converters are powered solely by the power supply capability of an expansion interface, such as Thunderbolt or USB 3.0, or 4.0. The ray tracing accelerator has a similar structure to that disclosed above, except that rather than a driver executing on the host processor to define rays and manage storage of ray definition data in a system memory, such tasks can be handled by code executing within the programmable shader clusters. The shading of rays that have completed intersection testing is performed within the programmable shader clusters. Shading results can be contributed to frame buffer(s) located in a memory that can be read by a host processor that executes an application that will use the frame buffer results. The application can communicate rendering instructions using an application programming interface, such as a version of Open GL® and/or Open RL®. In an example implementation on a 28 nanometer TSMC process, such single semiconductor substrate is expected to process at least 65 million rays per second using under 10 watts, and up to around 75 million rays per second within 10 watts. These various metrics assume a scene using at least 100,000 primitives, in general.

The foregoing metrics are also for rays that are not restricted and include rays that are secondary rays, such as diffuse and specular reflection rays, shadow rays, refraction rays and so on, from various different points in a scene. As such, these metrics do not assume coherency of the set of rays tested in order to render a given image (e.g., by testing only camera rays, that originate from a camera point), or rays that are assumed to be traveling in a single direction. Also, these metrics assume a relatively large amount of shading computation per ray, which is performed by software (either in general purpose processor core(s) or in a programmable computation cluster designed for graphics computation workloads).

Figure 23:
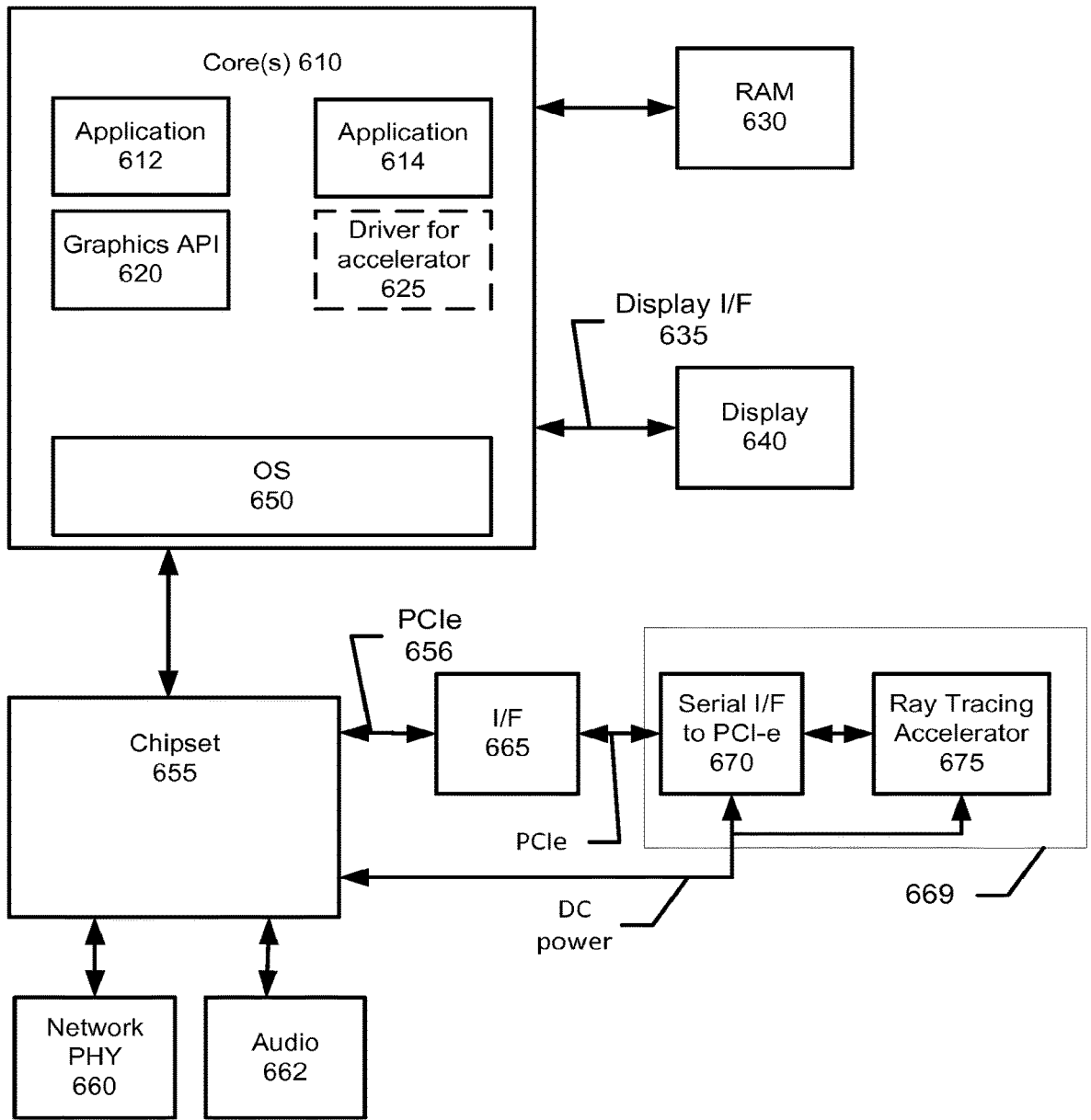
FIG. 23 depicts an example system setup in which can be implemented further aspects of the disclosure.

FIG. 23 depicts an example setup according to the disclosure, in which a computation platform includes one or more programmable processor cores (610), executing applications (612-614), and an operating system 650. Such OS 650 supports a graphics API 620, a driver 625 for a ray tracing accelerator can be supplied (for the first embodiment described above), a RAM 630 provides a main volatile storage for core(s) 610. A cache hierarchy is not separately depicted. A display 640 can be coupled to core(s) 610 over a display interface 635. Chipset 655 can support one or more PCI express interface lanes. One is identified 56, as being coupled to a serial interface 665, which converts PCI to a particular interface protocol that is suitable for external chassis communication, such as Thunderbolt or USB. Reference numeral 669 identifies a boundary of an external enclosure for ray tracing accelerator 675. Chipset 55 also supports other functions, such as network 660 and audio 662. DC power is supplied to ray tracing accelerator 675 over the power supply sourcing capability of the interface, such as USB or Thunderbolt, and accelerator 675 has no provision for any direct power supply connection, such as separate DC power supply connection. However, some implementations may support multiple interfaces with a computing platform. These interfaces can carry one or more of power and data. However, a baseline configuration supports a single interface, and operates solely within the power envelope supported by a single interface.

Figure 24:
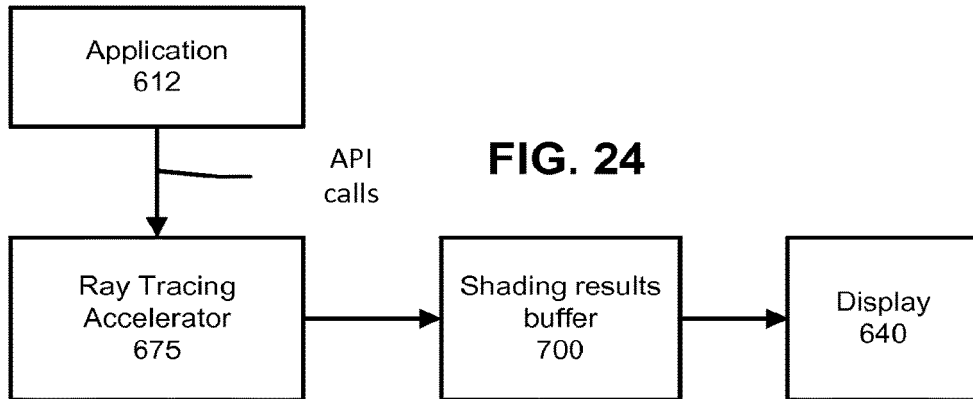
FIG. 24 depicts a general flow of data in an example of the further aspects where a ray tracing accelerator is formed on a single semiconductor substrate with a programmable shading cluster.

FIG. 24 depicts a general flow of data in an embodiment where the ray tracing accelerator is formed on a single semiconductor substrate with a programmable shading cluster (second embodiment). In such an implementation, application 612 supplies API calls to ray tracing accelerator 675, which do not need to be ray tracing specific, but instead can be general draw calls for a graphics API. Accelerator 675 sends outputs to shading results buffer 700, which can be displayed, or can be used for further processing, such as compositing, or for video processing, storage, and so on.

Figure 25:
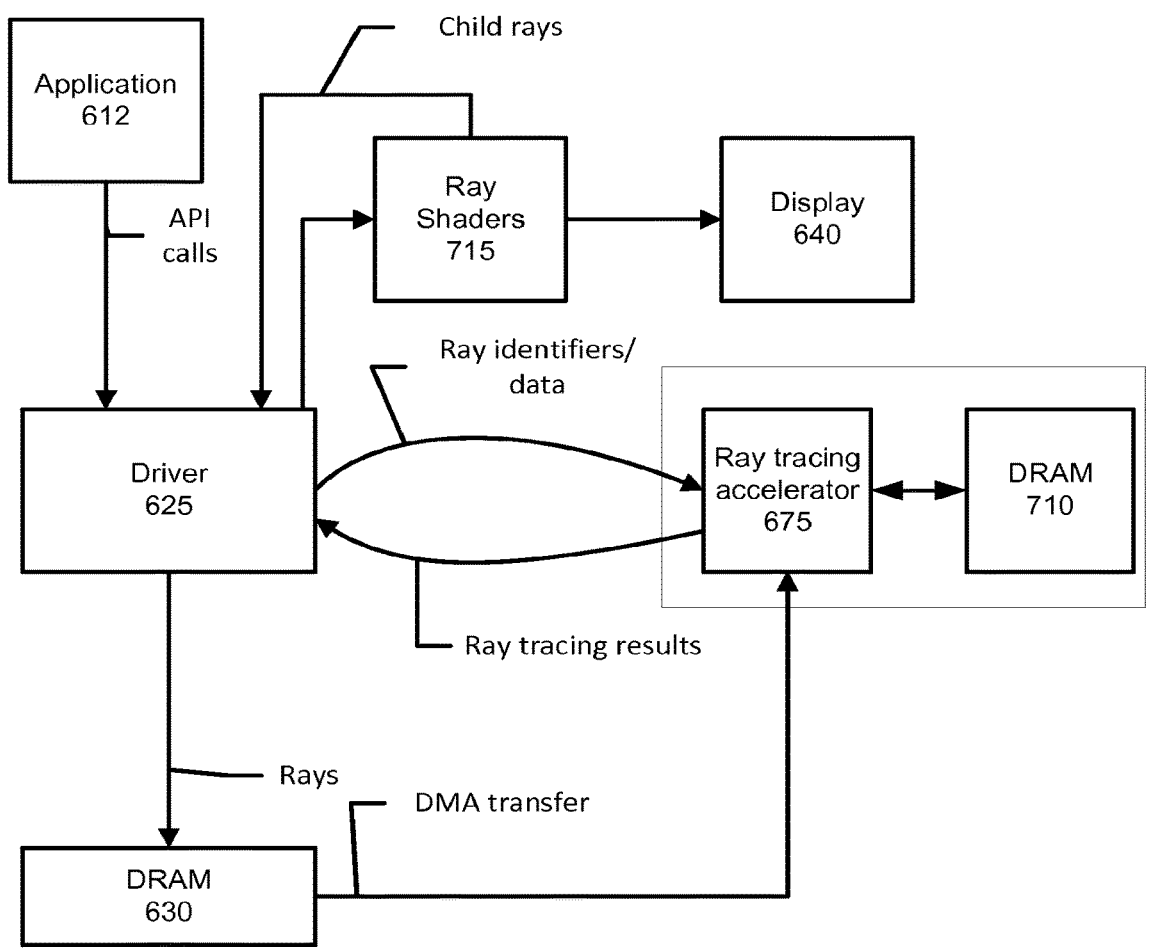
FIG. 25 depicts an example data flow in another example of the further aspects in which an accelerator operates on rays defined by software executing on a host CPU.

FIG. 25 depicts an example data flow for the first embodiment, in which accelerator 675 operates on rays defined by software executing on a host CPPU. In such cases, application 612 can emit api calls to driver 625, which handles ray instantiation, and also receives ray tracing results, and then controls ray shader instantiation. Driver 625 can interface with DRAM 630 to store rays, which are then read into ray tracing accelerator 675. DRAM 630 also stores the scene database and the acceleration structure. DRAM 710 can replicate all or some portion of the scene database and acceleration structure.

Figure 26:
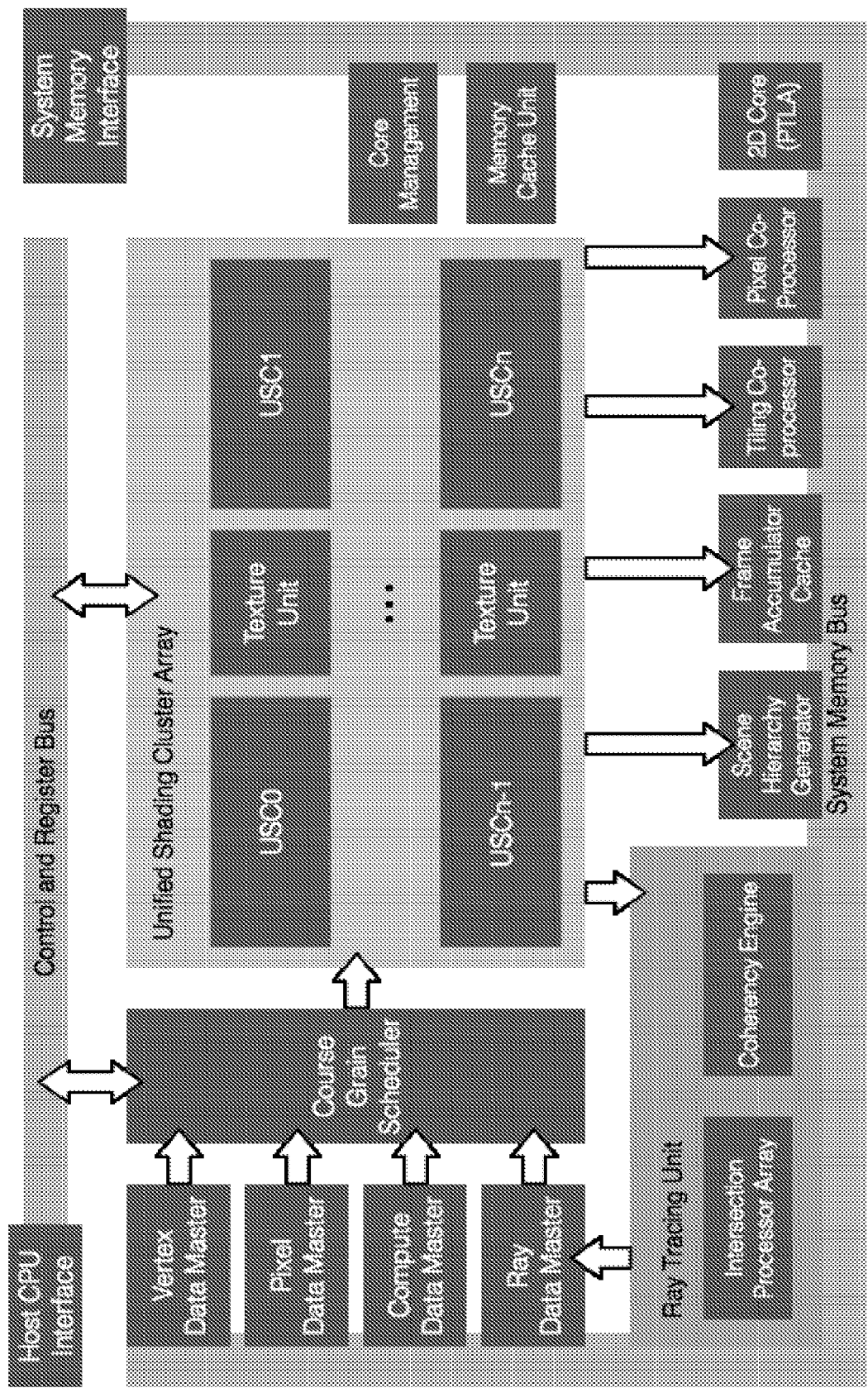
FIG. 26 depicts an example of a semiconductor SOC that includes programmable shading clusters, a ray tracing accelerator and data masters.

FIG. 26 depicts an example of a semiconductor SOC that includes programmable shading clusters, a ray tracing accelerator, and data masters that control submission of different types of computations. As such FIG. 26 depicts an example SOC that can support both rasterization and ray tracing. In such example, the SOC supports shading and texturing operations for rasterization and for ray tracing on the unified shading cluster array.

Figure 27:
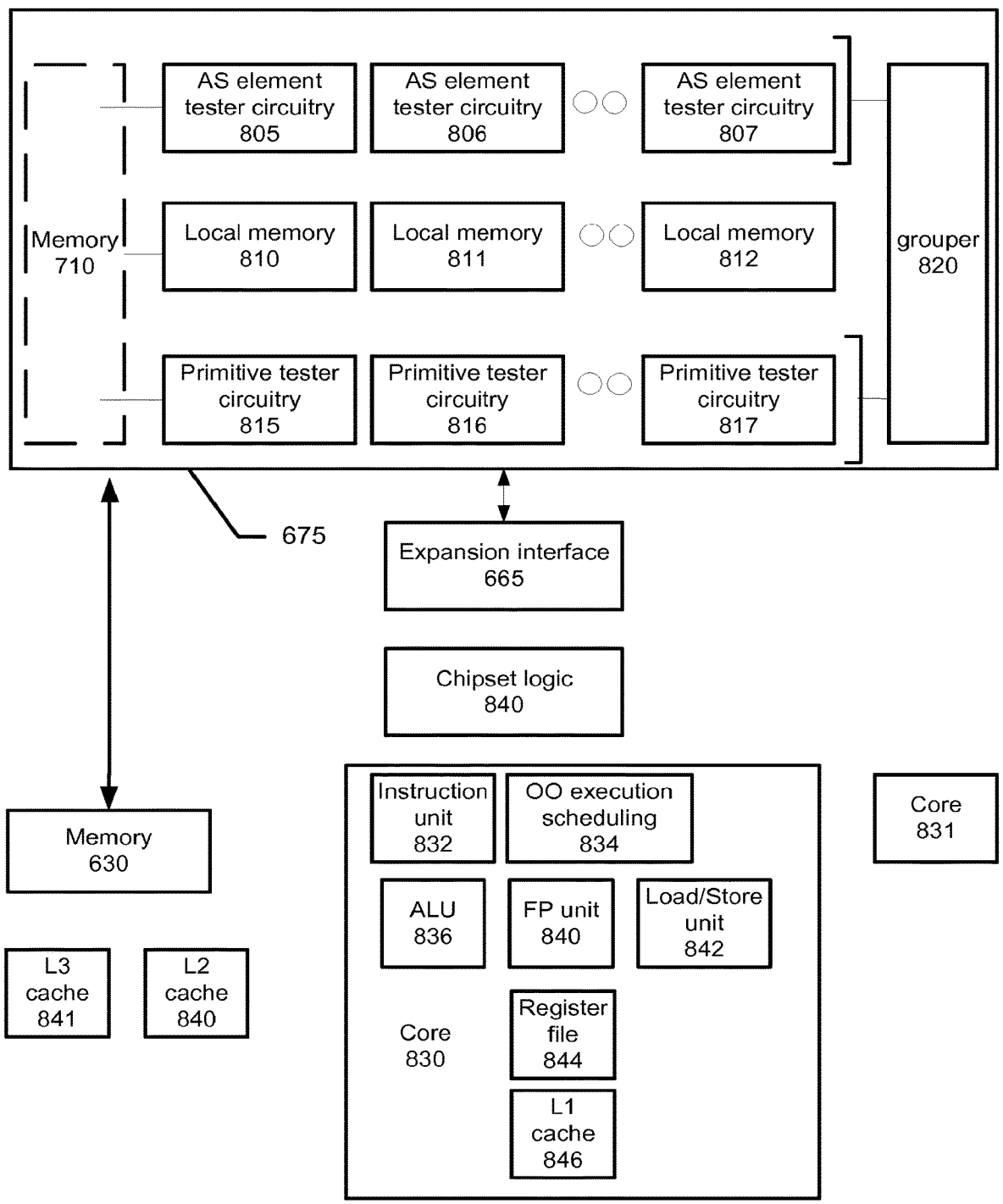
FIG. 27 depicts an example processor system in which can be implemented aspects according to the disclosure.

FIG. 27 depicts an example ray tracing accelerator 675. A grouper 820 receives data defining results of testing each ray with acceleration structure elements, and then grouper 820 determines what acceleration element or elements should be tested next for that ray, and ultimately, primitives bounded by acceleration structure element(s) that cannot be excluded are identified for testing. As such, grouper 820 can be implemented by a cache that stores identifiers for rays in association with an identifier for an acceleration structure element. Grouper 820 can send the identifiers for the rays and the identifier for an acceleration structure element on a broadcast to the tester circuits (or on different broadcasts for acceleration structure testers and primitive testers), and each circuit can identify what rays are stored in a local private memory and proceed to test those rays. As such, rays can be loaded and striped into the local memories. Picker logic can be associated with each tester circuit to interface with the bus. A buffer can be provided to buffer some number of tests that await commencement.

In relation to the aspects described above with reference to FIGS. 23 to 27, there may be provided a system for ray-tracing based rendering, comprising: a system memory; a main processor coupled with the system memory and configured to execute an application, the application using a 3-D scene, for which 2-D images are to be rendered; an interface module coupled with the main processor and with circuitry for providing an expansion interface, the expansion interface comprising a data signal path and a power path, wherein the power path supports a maximum electrical load of less than 10 watts; a ray tracing accelerator coupled with the data signal path of the interface module for data communication and with the power path of the interface module as a mains source of power, the ray tracing accelerator configured to receive definition data for rays to be tested for intersection within the 3-D scene, based on geometry for the 3-D scene stored in the system memory, and to return data indicating identified intersections between the rays and geometry in the 3-D scene, wherein the main processor is capable of being configured to execute shading code for shading the intersections identified by the ray tracing accelerator, and the executing shading code emits rays, for which definition data is provided to the ray tracing accelerator, and wherein the ray tracing accelerator comprises circuitry capable of testing, per second, at least five million different rays for intersection with elements of a 3-D scene acceleration structure, and of testing, per second, at least two million rays for intersection with geometry primitives, and interfacing with the system memory to obtain definition data for the elements of the 3-D scene acceleration structure and the geometry primitives, while consuming less than about 10 watts of power.

The power path of the expansion interface may operate at about 19V, and may support up to about 550 mA of instantaneous current. In some examples, the ray tracing accelerator may have a maximum instantaneous power consumption of no more than 10 watts of instantaneous power. In some examples, the ray tracing accelerator may have an average power consumption, during instantaneous power consumption of no more than 10 watts of instantaneous power. The ray tracing accelerator may comprise a PCI express interface and a translation interface to a serial data interface and the interface module may comprise a serial interface coupling to a PCI express data interface. The ray tracing accelerator may comprise circuitry manufactured in a ninety nanometer process. The ray tracing accelerator may comprise circuitry manufactured in a ninety nanometer process and executing at 350 megahertz. The ray tracing accelerator may comprise circuitry manufactured in a ninety nanometer process, executing at 350 megahertz, and consuming around 9.9 watts. The ray tracing accelerator may comprise circuitry configured for performing around eleven billion tests per second between acceleration structure elements and rays. The ray tracing accelerator may comprise circuitry configured for performing around 2.8 billion tests per second between primitives and rays.

Furthermore, there may be provided a 3-D rendering system, comprising: an application process configured to execute an application that uses a 3-D scene for rendering 2-D images; an interface comprising a data port and a power port, the power port rated as being capable of delivering a maximum of 10 watts of power; and a ray tracing accelerator coupled with the interface, and using the power port as a sole source of power, the interface providing an expansion interface comprising a data signal path and a power path for the ray tracing accelerator, wherein the power path supports a maximum electrical load of less than 10 watts.

There may be provided a system for ray-tracing based rendering, comprising: a system memory; a main processor coupled with the system memory and configured to execute an application, the application using a 3-D scene, for which 2-D images are to be rendered, the application generating application programming interface (API) calls defining how the 2-D images are to be rendered; an interface module coupled with the main processor and with serial interface circuitry for providing an expansion interface, the expansion interface comprising a data signal path and a power path, wherein the power path supports a maximum electrical load of less than 10 watts; a ray tracing accelerator coupled with the data signal path of the interface module for data communication and with the power path of the interface module as a mains source of power, the ray tracing accelerator configured to receive definition data for rays to be tested for intersection within the 3-D scene, based on geometry for the 3-D scene stored in the system memory, and to return data indicating identified intersections between the rays and geometry in the 3-D scene, wherein the main processor is capable of being configured to execute shading code for shading the intersections identified by the ray tracing accelerator, and the executing shading code emits rays, for which definition data is provided to the ray tracing accelerator, and the ray tracing accelerator comprises circuitry capable of testing, per second, at least five million different rays for intersection with elements of a 3-D scene acceleration structure, and of testing, per second, at least two million rays for intersection with geometry primitives, and interfacing with the system memory to obtain definition data for the elements of the 3-D scene acceleration structure and the geometry primitives, while consuming less than about 10 watts of power.

There may be provided a computation system, comprising: an application process configured to execute a 3-D graphics application; an expansion interface comprising a power coupling and a data coupling; a ray tracing accelerator coupled to the expansion interface; and wherein the computation system is configured to be capable of producing renderings from a 3-D scene using at least 5 million rays per second, shading intersections and using no more than 10 watts of power on average to traverse the 5 million rays per second through the 3-D scene to identify an intersection for each ray, if any. The 5 million rays may comprise both primary rays, emitting directly from pixels, and secondary rays emitted during execution of shaders in response to previously identified intersections.

There may be provided a computation system comprising: a central processing unit comprising one or more programmable cores; a memory for storing geometry defining a 3-D scene, and an acceleration structure comprising elements that bound respective subsets of the geometry; and a ray tracing accelerator element comprising fixed-function ray tracing logic, wherein the central processing unit, when programmed, is capable of completing up to 2 million rays per second, the completing of each ray comprising defining that ray, traversing the ray through an acceleration structure, testing the ray against any primitives not excluded from being potentially intersected by that ray, and then shading an intersection for that ray, if any, wherein the shading of each ray comprises performing around 2000 floating point operations, and wherein using both the central processing unit and the ray tracing acceleration provides a capability of completing at least 10 million rays per second, the completing of each ray comprising defining that ray, traversing the ray through an acceleration structure, testing the ray against any primitives not excluded from being potentially intersected by that ray, and then shading an intersection for that ray, if any, wherein the shading of each ray comprises performing around 2000 floating point operations.

The computation system, when using the central processing unit, may consume at least 15 watts to process about one million rays per second. In some examples, the computation system, when using the central processing unit to process about one million rays per second, consumes about twelve watts more than an idle power consumption for the computation system. The ray tracing accelerator may be coupled with a graphics processing unit, and the computation system may be capable of completing at least 70 million rays per second, the completing of each ray comprising defining that ray, traversing the ray through an acceleration structure, testing the ray against any primitives not excluded from being potentially intersected by that ray, and then shading an intersection for that ray, if any, wherein the shading of each ray may comprise performing around 2000 floating point operations. In some examples, the combination of the ray tracing accelerator and the graphics processing unit uses no more than 10 watts. In some examples, the combination of the ray tracing accelerator and the graphics processing unit uses no more than 10 watts operating at 0.9 v in a 28 nanometer TSMC high performance mobile process. The floating point operations may be performed using a 4-wide SIMD ALU. The 3-D scene may comprise at least 100,000 primitives used to form one or more objects in the 3-D scene.

The term "subsystem" was used in naming various structural components that may be found in implementations of the disclosure. The term "subsystem" by itself does not imply that structures or circuitry used to implement such a subsystem need to be separate or distinct from structures or circuits that implement other subsystems. In fact, it is expected that programmable elements within a system can be used to implement different subsystems of that system. In general, any subsystem, unit or functional component described herein can be implemented using a programmable computation unit, such as a processor, in conjunction with supporting circuitry that is configured to execute a relevant function or process. Some subsystems, units or functional components may be entirely or partially implemented in limited programmability or fixed function hardware. For example, a scanning component can be implemented using limited configurability circuitry that accepts parameters to setup a triangular primitive for scanning, but does not support scanning of an arbitrary primitive shape. Similarly, a ray tracing subsystem can include a ray intersection testing element that supports a particular kind of intersection test for triangles, and a particular kind of acceleration structure element, in limited programmability circuitry (or two different portions of circuitry). In each of these cases, machine code could be used to configure a processor for implementing these functions, but with an anticipated loss of efficiency.

Also, subsystems themselves may have multiple functional components, and structures used to implement different of these functional components also may implement other functional components. Still further, in some situations, the operation or function of one functional component may also serve to implement another functional component or some portion thereof. For example, a rasterization subsystem can identify visible surfaces for pixels in a frame. Such rasterization subsystem can involve a component that transforms geometry into screen space, a scanning component that determines what pixel is overlapped by each element of geometry and a sorting component that identifies which element of geometry is closest. While such components function, a byproduct can be interpolated parameters for pixels overlapped by the geometry.

For clarity in description, data for a certain type of object, e.g., a primitive (e.g., coordinates for three vertices of a triangle) often is described simply as the object itself, rather than referring to the data for the object. For example, if referring to "a primitive", it is to be understood that such terminology can in effect refer to data representative of that primitive.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of each of the processes described herein includes machine executable code used to configure a machine to perform such process implementation. Other means for realizing implementations of the disclosed processes includes using special purpose or limited-programmability hardware to realize portions of the processes, while allocating overall control and management and a decision when to invoke such hardware to software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented. The use of the articles "a" and "an", unless explicitly stated otherwise, include both the singular and plural. Also, the identification of a plurality of elements, such as a plurality of processing cores, or a plurality of rays, does not imply that such plurality includes all such elements that may exist or be processed within.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A process for interfacing with an imaging device, comprising:
    presenting an interface comprising a display area for displaying an image, the interface comprising
        a reticle presented on the display area, and
        a slider element comprising a first end, a second end, and a position indicator;
    associating the first end of the slider element with infinite depth of field, and the second end of the slider element with shallow depth of field;
    accepting inputs through the user interface, indicating movement of the position indicator of the slider element, and responsively re-rendering the reticle to have a different prominence; and
    subsequently setting one or more of an exposure level and a focal plane for rendering the image based on a position of reticle; and
    executing rendering processes to produce the image according to the exposure level and focal plane.

2. The process for interfacing with an imaging device of claim 1, further comprising accepting inputs through the user interface, indicating movement of the position indicator of the slider element from the first end towards the second end, and responsively re-rendering the reticle to have a greater prominence.

3. The process for interfacing with an imaging device of claim 1, the interface comprising a further reticle, wherein the reticle and the further reticle are presented on the display are overlapping each other, and the reticle is rendered less prominently than the further reticle.

4. The process for interfacing with an imaging device of claim 3, further comprising accepting inputs through the user interface, indicating movement of the position indicator of the slider element from the first end towards the second end, and responsively re-rendering the reticle to have a prominence corresponding to that of the further reticle.

5. The process for interfacing with an imaging device of claim 3, further comprising accepting, through the interface, an indication to unlink the reticle and the further reticle, and responsively displaying the reticles in non-overlapping positions on the image.

6. The process for interfacing with an imaging device of claim 3, further comprising accepting, through the interface, interaction with the slider element returning the position indicator to the first end, and responsively ceasing display of the reticle and storing a last position of the reticle in a memory.

7. The process for interfacing with an imaging device of claim 3, further comprising accepting inputs through the user interface, indicating movement of the further reticle separately from the reticle, and setting an exposure level based on a currently-rendered value of a pixel at the location of the further reticle.

8. The process for interfacing with an imaging device of claim 1, further comprising setting a focal distance according to an object in the 3-D scene visible at a pixel overlapped by the reticle.

9. An apparatus for rendering images from 3-D scene data, comprising;
    a non-transitory memory; and
    one or more processors collectively configured to perform a process comprising
        displaying a 2-D image produced from a 3-D scene by a renderer,
        accepting interaction with the 2-D image, the interaction identifying a pixel of the 2-D image,
        mapping the identified pixel to an object in the 3-D scene that provides a visible surface for the identified pixel,
        determining a depth of the object from a current viewpoint, and
        subsequent to accepting interaction with the 2-D image, re-rendering the 2-D image to adjust a focus of pixels in the 2-D image based on relative depths of respective visible surfaces for those pixels of the 2-D image and the depth of the object providing the visible surface for the identified pixel.

10. The apparatus for rendering images from 3-D scene data of claim 9, further comprising displaying an autofocus reticle on the 2-D image.

11. The apparatus for rendering images from 3-D scene data of claim 10, wherein accepting interaction with the 2-D image comprises accepting interaction with the autofocus reticle, the interaction indicating movement of the autofocus reticle within the 2-D image, allowing different pixels of the 2-D image to be selected for autofocus.

12. The apparatus for rendering images from 3-D scene data of claim 9, further comprising identifying a pixel of the 2-D image currently overlapped by the autofocus reticle.

13. The apparatus for rendering images from 3-D scene data of claim 9, wherein the adjusting of the focus further comprises adjusting the focus of pixels of the 2-D image based on a depth of field setting.

14. The apparatus for rendering images from 3-D scene data of claim 9, wherein the process further comprises providing an autoexposure reticle, and accepting separate inputs for independently positioning each of the autoexposure and autofocus reticles.

15. The apparatus for rendering images from 3-D scene data of claim 9, wherein the process further comprises hiding the autofocus reticle responsive to an input setting an infinite depth of field.

16. The apparatus for rendering images from 3-D scene data of claim 9, further comprising storing a last-visible position of the autofocus reticle, and responsive to setting a finite depth of field, making the autofocus reticle visible at the last-visible position.

17. The process for interfacing with an imaging device as set forth in claim 1, wherein re-rendering the reticle changes the appearance of the reticle.

* * * * *